US012768490B2

(12) United States Patent
Eble et al.

(10) Patent No.: US 12,768,490 B2
(45) Date of Patent: Oct. 20, 2026

(54) FLUID TRANSFER SYSTEM, SWIVEL JOINT DEVICE INCLUDING SUCH A SYSTEM, STACK OF SWIVEL JOINT DEVICES AND FLUID EXPLOITATION INSTALLATION

(71) Applicant: ETI GROUP, Gemenos (FR)

(72) Inventors: Jean-Claude Eble, Gattieres (FR); Philippe Menardo, Beaulieu-sur-Mer (FR); Laurent Saint-Michel, Aubagne (FR)

(73) Assignee: ETI GROUP, Gemenos (FR)

( * ) Notice: Subject to any disclaimer, the term of this patent is extended or adjusted under 35 U.S.C. 154(b) by 60 days.

(21) Appl. No.: 18/770,244

(22) Filed: Jul. 11, 2024

(65) Prior Publication Data

US 2025/0020257 A1 Jan. 16, 2025

(30) Foreign Application Priority Data

Jul. 12, 2023 (FR) ....................................... 2307477

(51) Int. Cl.

| | |
|---|---|
| ***F16L 59/14*** | (2006.01) |
| ***F16L 39/04*** | (2006.01) |
| ***F16L 59/18*** | (2006.01) |

(52) U.S. Cl.

CPC ............. *F16L 59/141* (2013.01); *F16L 39/04* (2013.01); *F16L 59/185* (2013.01)

(58) Field of Classification Search

CPC ........ F16L 39/005; F16L 39/04; F16L 59/185; F16L 59/141; F16L 59/065

See application file for complete search history.

(56) References Cited

U.S. PATENT DOCUMENTS

| | | | | |
|---|---|---|---|---|
| 3,984,059 A | | 10/1976 | Davies | |
| 2021/0071795 A1* | | 3/2021 | Umemura | F16L 39/04 |
| 2022/0373119 A1* | | 11/2022 | Bryant | F16L 39/005 |
| 2023/0102097 A1* | | 3/2023 | Soulie | F16L 39/005 |

FOREIGN PATENT DOCUMENTS

| | | | | |
|---|---|---|---|---|
| CN | 114593289 A * | 6/2022 | | F16L 59/065 |
| EP | 1549874 B1 | 7/2012 | | |
| EP | 2356018 B1 | 5/2017 | | |
| WO | WO-2017010405 A1 * | 1/2017 | | F16L 59/185 |
| WO | 2020016406 A1 | 1/2020 | | |

OTHER PUBLICATIONS

Search Report and Written Opinion for FR2307477, dated Dec. 22, 2023, 8 pages.

* cited by examiner

*Primary Examiner* — Zachary T Dragicevich
(74) *Attorney, Agent, or Firm* — NIXON & VANDERHYE

(57) ABSTRACT

A fluid transfer system includes a liquid transfer pipe and a gas transfer pipe that are concentric, the gas transfer pipe surrounding the liquid transfer pipe, and a buffer member, disposed between the liquid transfer pipe and the gas transfer pipe and surrounding at least partially the liquid transfer pipe, the buffer member being configured to transfer an evaporated portion of the liquefied gas circulating in the liquid transfer pipe from the liquid transfer pipe to the gas transfer pipe. A swivel joint device including such a system stack of swivel joint devices, and fluid exploitation installation.

14 Claims, 10 Drawing Sheets

FLUID TRANSFER SYSTEM, SWIVEL JOINT DEVICE INCLUDING SUCH A SYSTEM, STACK OF SWIVEL JOINT DEVICES AND FLUID EXPLOITATION INSTALLATION

CROSS-REFERENCE TO RELATED APPLICATIONS

This application claims priority to FR 2307477 filed Jul. 12, 2023, the entire contents of which are hereby incorporated by reference.

TECHNICAL FIELD OF THE INVENTION

The invention relates to a fluid exploitation installation.

It also relates to a fluid transfer system used in such an installation.

The invention applies in particular for a fluid having at least a liquid state or a gaseous state according to a temperature to which it is brought, and the state of which, liquid or gaseous, has a strong impact on the volume occupied by the same quantity of fluid.

Such a fluid exploitation installation may be, for example, a hydrocarbon exploitation installation on an offshore type platform.

The invention may for example relate to a submerged or surface fluid transfer system, used for a hydrocarbon transfer, for example between a submerged PLEM (abbreviation of "Pipe Line End Manifold") and any nearby moored ship, or a ship and a carrier. Such a ship includes an FPSO ("Floating Production Storage Offloading unit"), an FSO ("Floating Storage and Offloading"), an FSRU ("Floating Storage and Regasification Unit"), an FLNG ("Floating Liquified Natural Gas") or other unit.

The invention may for example find a particular application for the transfer of liquefied gas, for example ammonia, or liquid methane (which is liquid at a temperature below approximately −160° C.) which is a main constituent of liquefied natural gas (LNG) after separation from water, $CO_2$ and the constituents of liquefied petroleum gas (LPG).

Prior Art

European patent EP 2 356 018 describes an installation for transferring fluid between an offshore natural gas extraction and liquefaction unit, and a liquefied natural gas (LNG) carrier. To perform the transfer, the installation comprises, on one side, a cryogenic LNG transfer line between the offshore unit and the carrier, and on another side, a gas return line. In a particular case of natural gas (NG) export, one problem is essentially linked with a strong dependence on a state of the natural gas (essentially gaseous or liquid) according to temperature and pressure conditions of an environment wherein the NG resides. Indeed, NG is naturally found in a gaseous state, under pressure, at a positive temperature, i.e. at least equal to 0° C. (typically about 120° C. at 300 bar in a reservoir rock), while it is in a liquid state when it is brought to a temperature below about −160° C., at 1 bar absolute, after refining. Natural gas in the liquid state is referred to as LNG (liquefied natural gas).

This change of state has a strong impact on the volume occupied by the same quantity of NG.

It is possible to store about 600 times more NG in the liquid state than in the gaseous state in the same volume. Hence, it is much more advantageous to store or transport NG in the liquid state (i.e. LNG) than in the gaseous state.

However, storing LNG requires very effective thermal insulation so that it can retain its liquid state and not return to a gaseous state because the pressure of the fluid would then be likely to increase to approximately 600 bar.

Nevertheless, when transferring NG, for example from a ship to a carrier, a buoy or even a land-based site, while the NG is initially in a liquid state, a portion of the NG evaporates.

Preferably, this evaporated portion must then be returned to a liquefaction unit, for example located on the ship, to refine it and liquefy it again to minimise any production loss and potential greenhouse gas-related pollution.

In an installation such as that described in the aforementioned patent or similar, a floating offshore unit therefore has the function of extracting, refining, converting and/or transferring crude fluids, or electricity obtained by evaporated NG combustion.

A non-limiting example of such a floating unit is known as "FPSO" ("Floating Production Storage Offloading unit").

Such a floating unit is for example formed by a ship, which is mobile on account of its environment, around a mooring turret, which is geostationary, via a main journal bearing. The ship may be temporarily moored to the turret.

Such an installation may include pipes which form an underwater pipe network which allows fluidic communication to transfer a fluid between the seabed and the ship.

For this, the installation comprises at least one swivel joint device, or a stack of swivel joint devices known as a "swivel stack".

To ensure the tightness between the ship and the turret and thus ensure fluid transfer integrity, the swivel joint device is provided with a first so-called fixed part, considered geostationary, secured to the turret and a second so-called mobile part, secured to the ship. The second part of the swivel joint device is therefore rotatable with respect to the first, geostationary, part of the swivel joint device.

A swivel joint device is furthermore generally provided with several dynamic sealing members, called dynamic seals, disposed in spaces, that are frequently circular, arranged between the first fixed part and the second mobile part of the swivel joint device.

In the example of the exploitation of natural gas, the latter is pumped, then generally cleared of sand, water or other gases that it may contain to limit or prevent pipe incrustation or blockage. Such a separation is performed for example by distillation for gases (ethane, propane, $H_2S$, $CO_2$, etc.), and by settling or other processes to remove sand and water. The NG may then be liquefied, then thrust by floating pipes, for example flexible hoses, to a storage and/or transport entity, for example an export gas carrier (for example a methane carrier), for example moored in tandem, or a mooring buoy, to subsequently be transferred to a refinery on land, or even directly to a specific site, on land.

At least a first swivel joint device may therefore be located on the ship in order to extract the NG and send it to a separation installation, whereas at least another swivel joint device may be disposed to transfer the LNG from a liquefaction unit to the storage and/or transport entity, and to reroute a gas to the liquefaction unit.

The LNG transfer thus involves a passage via at least one swivel joint device capable of withstanding the cryogenic temperature of the LNG (i.e. approximately between −160° C. and −100° C. and between 1 bar and 25 bar absolute) so that it is kept in the liquid state as much as possible.

DISCLOSURE OF THE INVENTION

The invention relates, according to a first aspect, to a fluid transfer system configured to equip a fluid exploitation installation, the fluid transfer system including:

a liquid transfer pipe, configured to carry a liquefied gas, and a gas transfer pipe, configured to carry a gas in vapour form, characterised in that the liquid transfer pipe and the gas transfer pipe are concentric, the gas transfer pipe surrounding the liquid transfer pipe, and in that the fluid transfer system furthermore includes:

a buffer member, disposed between the liquid transfer pipe and the gas transfer pipe and surrounding at least partially the liquid transfer pipe, the buffer member being configured to transfer an evaporated portion of the liquefied gas circulating in the liquid transfer pipe from the liquid transfer pipe to the gas transfer pipe.

A fluid refers here to any deformable medium, including mainly a liquid and a gas, as opposed to a solid medium. A fluid therefore refers here indifferently to a liquid or a gas, or a mixture of liquid and gas.

While the invention is applied in particular to the transfer of LNG as liquefied gas, it can nonetheless be applied to any gas or gas mixture, diphasic under so-called "normal" transfer conditions, such as for example, without being restrictive, liquefied petroleum gas (LPG), carbon dioxide ($CO_2$), optionally under pressure, for example at a pressure at least equal to 5.11 bar and a temperature at least equal to −56° C., ammonia ($NH_3$), liquefied nitrogen (annotated $LN_2$), liquefied argon (ArL), liquefied helium (HeL), etc.

In a particular example implementation, the gas in vapour form circulating in the gas transfer pipe includes evaporated liquefied gas.

The fluid transfer system according to the invention makes it possible to contribute to thermal insulation of the liquid transfer pipe forming a central channel intended for liquefied gas, using the gas transfer pipe to surround it, and makes it possible to separate the two flows (liquid and gas) by an intermediate volume formed by the buffer member.

Thus, the gas transfer pipe encases the liquid transfer pipe and forms a thermal barrier and a differential pressure damper.

Evaporated gas from the liquid may thus circulate in the buffer member and escape into the gas transfer pipe.

The gas transfer pipe is then configured to recover and circulate an evaporated portion, or fraction, of the liquid.

Leaks generated in the system may then be recovered.

In an example embodiment, a gas transfer pipe is a gas return pipe, configured to carry an evaporated portion of the liquefied gas.

Such a fluid transfer system is thus capable of transferring the liquefied gas, for example to a transport and/or storage unit, and returning the evaporated fraction, for example to a liquefaction unit.

Such a fluid transfer system is applied for example to installation capable of purifying natural gas extracted from underwater petroleum and gas deposits, liquefying it and storing it to finally transfer it either via a stack of swivel joint devices, or a mooring and loading buoy—not restricted to either or to one of each—to a methane carrier transferring to a refinery or a port, or via an offloading buoy allowing a methane carrier to supply a refinery via a cryogenic underwater pipeline.

In use, a pressure in the gas transfer pipe is generally greater than that in the liquid transfer pipe.

Thanks to the buffer member, the system can thus tend towards pressure equilibrium. When liquid passes from the liquid transfer pipe to the buffer member, it will be in a hotter zone than the liquid transfer pipe and it will therefore be evaporated and automatically counterbalance the liquid pressure.

The buffer member thus includes an internal volume forming a chamber between the liquid transfer pipe and the gas transfer pipe.

For example, the buffer member includes a fluid inlet configured to introduce fluid, from the liquid transfer pipe, into the buffer member.

A wall of the liquid transfer pipe may for example include at least one orifice opening into the buffer member.

For example, the fluid inlet includes the at least one orifice of the wall of the liquid transfer pipe.

For example, the buffer member includes a fluid outlet configured to extract fluid from the buffer member to the gas transfer pipe.

A wall of the gas transfer pipe may for example include at least one orifice opening into the buffer member.

For example, the fluid outlet includes the at least one orifice of the wall of the gas transfer pipe.

In an example embodiment, the fluid transfer system includes at least one dynamic sealing member.

The dynamic sealing member may be disposed in the buffer member, for example at an interface between the buffer member and the liquid transfer pipe and/or the gas transfer pipe.

In an example embodiment, the dynamic sealing member includes a seal, a journal bearing, or a composite assembly.

In another example embodiment, in particular if the fluid has no lubricant power, the dynamic sealing member may include a journal bearing.

A journal bearing makes it possible in particular to be able to produce a natural leak.

As a general rule within the scope of the present invention, a seal may be made of ultra-high molecular weight polyethylene (generally referred to as the acronym "UHMWPE").

As a general rule within the scope of the present invention, a journal bearing may be made of PTFE filled with carbon powder or fibres.

For example, the fluid inlet in the buffer member includes a leak passage, for example produced by a dynamic sealing member.

For example, the fluid outlet from the buffer member includes a leak passage, for example produced by a dynamic sealing member.

In an example embodiment, the fluid inlet includes at least one safety valve.

The safety valve is for example configured to balance an overpressure between the liquid transfer pipe and the buffer member.

It thus makes it possible to manage fluid leaks, from the liquid transfer pipe, into the buffer member to the gas transfer pipe.

Thus, any overpressure in the liquid transfer pipe is released in the buffer member by at least one calibrated safety valve.

For example, the at least one orifice of the wall of the liquid transfer pipe is equipped with the at least one safety valve.

In an example embodiment, the fluid outlet includes at least one exhaust valve.

The exhaust valve is for example configured to balance an overpressure between the buffer member and the gas transfer pipe.

Thus, any overpressure in the buffer member is released in the gas transfer pipe by at least one calibrated exhaust valve.

For example, the at least one orifice of the wall of the gas transfer pipe is equipped with the at least one exhaust valve.

In an example embodiment, the buffer member includes at least one inner wall forming a labyrinth for a fluidic flow in the buffer member.

In an example embodiment, the inner wall divides the internal volume of the buffer member into at least two chambers, the fluid inlet being disposed in a first of the two chambers, and the fluid outlet being disposed in a second of the two chambers.

Thus, the first of the two chambers is the innermost of the two chambers, i.e. juxtaposed to the liquid transfer pipe, and the second of the two chambers is the outermost of the two chambers, i.e. juxtaposed to the gas transfer pipe.

For example, the inner wall is configured to allow a passage of fluid from the first chamber to the second chamber.

In an example embodiment, the inner wall includes at least one fluid transmission orifice.

In an example embodiment, the inner wall includes at least one balancing valve, for example disposed in the fluid transmission orifice.

The balancing valve is for example configured to balance a pressure between the two chambers of the buffer member.

For example, the inner wall may include at least two walls, or parts, thus dividing the internal volume of the buffer member into at least a third chamber. The third chamber is thus formed between the first chamber and the second chamber.

At least one of the parts of the inner wall, or each of the parts, may then include a fluid transmission orifice.

Where applicable, a balancing valve formed in the part of the inner wall between the first chamber and the third chamber, in particular in the corresponding fluid transmission orifice, then forms a first balancing valve.

Where applicable, a balancing valve formed in the inner wall between the third chamber and the second chamber, in particular in the corresponding fluid transmission orifice, then forms a second balancing valve.

As a general rule, the at least one orifice arranged in at least one part of the inner wall, and/or a valve (also referred to a micro-valve) optionally equipping such an orifice, are sized according to the configuration of the buffer member, or more generally the fluid transfer system, and managements of fluid pressure sought in the buffer member.

Therefore, there may be several orifices, and/or several valves, disposed in one direction or another according to the pressures sought.

A valve network may therefore be configured, as desired, to manage a usable overpressure to energise the joints and for their maintenance.

According to the sought situation, each valve may therefore be disposed, in one direction or another, and sized, to control the different pressure transfers in the at least one chamber of the buffer member.

For example, a second balancing valve may be mounted in the opposite direction relative to the first balancing valve.

Mounting balancing valves in opposite directions makes it possible optionally, for example, to generate an overpressure of a valve of the calibration of the safety valve in the first chamber while allowing maintenance or setting to manual overpressure of the two other chambers, for example with a gas injection as described hereinafter.

In an example embodiment, the buffer member is annular and surrounds the liquid transfer pipe.

The buffer member thus contributes to the thermal insulation of the liquid transfer pipe and to the collection of any leaks that may arise therefrom.

Another advantage of the fluid transfer system having at least one buffer member is being able to make use of gravity.

Thus, a gaseous counterpressure helps keeping the liquid in its circuit more than the sealing produced by a dynamic sealing member.

In an example embodiment, the fluid transfer system is configured so that a liquid flow in the liquid transfer pipe is along a first direction, for example downward, i.e. according to gravity, and so that a gas flow in the gas transfer pipe is also along the first direction.

In an example embodiment, the fluid transfer system is configured so that a liquid flow in the liquid transfer pipe is along a first direction, for example downward, i.e. according to gravity, and so that a gas flow in the gas transfer pipe is along a second direction, opposite the first, for example upward.

In a particular example implementation, the fluid transfer system is configured so that a liquid flow is downward, i.e. according to gravity, and so that a gas flow is upward, i.e. against the liquid flow.

For example, the fluid inlet of the buffer member is offset relative to the fluid outlet relative to a longitudinal axis (X) of the liquid transfer pipe.

The longitudinal axis (X) of the liquid transfer pipe corresponds here to an average fluid flow line in the liquid transfer pipe.

In the case of cylindrical pipe with circular cross-section, the longitudinal axis (X) is an axis of revolution of said pipe.

In an example embodiment, at least one part of the fluid inlet in the buffer member is disposed at a lower height than a height of at least one part of the fluid outlet to ensure a low level for liquid and a high level for gas.

In an example embodiment, the fluid transfer system includes an insulating sheath.

For example, the insulating sheath surrounds at least one section of the gas transfer pipe.

The insulating sheath may surround at least one section of the liquid transfer pipe, for example a section juxtaposed to the buffer member.

For example, the insulating sheath includes a double-wall structure.

For example, the insulating sheath includes an insulating coating.

The insulation of the external structure is for example ensured at critical locations by the presence of a double wall which may include any type of insulating material and/or be put under vacuum inside the double wall.

In an example embodiment, the fluid transfer system includes a pressurisation system which includes a gas, the fluid transfer system being configured to inject gas from the pressurisation system in the internal volume of the buffer member.

The gas of the pressurisation system is for example an inert gas.

For example, the gas includes at least one gas from among: Nitrogen, Argon, Helium, or Methane, or any mixture thereof.

For example, the gas of the pressurisation system is configured to be in a gaseous state at a temperature greater than or equal to about −160° C.

For example, the gas of the pressurisation system is chosen from have a dew point below −160° C.

For example, the pressurisation system includes a pressurised dry gas cylinder.

For example, the fluid transfer system may include a pressure regulator configured to regulate a pressure in the buffer member.

By regulating the pressure in the buffer member, a gas volume in the buffer member will be pressurised according to a predefined pressure in order to maintain this pressure in the buffer member. By injecting a sufficient gas volume into the buffer member, a pressure will be established and oppose any liquid leak.

For example, for a defined pressure of 25 bar in the buffer member, and a pressure in the liquid transfer pipe varying between 10 bar and 20 bar, a calibration pressure of the safety valve is about 5 bar, as well as at least that of a balancing valve where applicable.

Thus, the buffer member makes it possible to limit or prevent liquid leaks from the liquid transfer pipe.

In an example embodiment, the buffer member includes a gas injection port configured to inject a gas, in particular a pressurised, inert and dry gas into the buffer member, for example in at least one chamber of the buffer member.

In an example embodiment, the fluid transfer system includes at least one manifold to inject gas into the buffer member via the gas injection port, referred to as overflow manifold.

The overflow manifold thus links the buffer member with the pressurisation system, which may include for example a pressurised dry gas cylinder.

Such a pressurisation system (potentially manual), with an overflow manifold, makes it possible to control leak flows, and especially purge and/or drain liquid and/or solid residues which may have been loaded, despite at least one purification of the fluid.

In such a fluid transfer system, it is therefore possible to clean at least one part of the fluid transfer system, for example the buffer member, with purges, optionally operated from outside the system, on the sealing surfaces and/or the friction surfaces: for example, journal bearings or seals according to the technique used.

This contributes to better safety of the fluid transfer system because pressurising with an inert gas may be performed without having to disassemble the system.

Moreover, limiting fouling of the fluid transfer system makes it possible to reduce its wear and therefore produce better operating reliability.

Furthermore, such a fluid transfer system makes it possible to monitor a liquid circulation pressure and contributes to quality of its sealing.

According to the type of fluid, this makes it possible to prevent atmospheric pollution and/or potential ignition of the gas in air.

Furthermore, this limits a cryopumping phenomenon, which may be risky, wherein water may frost and thus induce seal abrasion, noise, and/or also form clathrates according to the fluid used, in particular methane clathrates where applicable, i.e. compounds wherein methane molecules are trapped in a lattice of water molecules. Such clathrates form a type of wax which contributes to the wear of the system and incidentally generates undesired leaks. It is therefore preferable to be able to prevent clathrate formation.

The use of a pressurisation with an inert and dry gas as described above, even during system operation, thus makes it possible to inert, test, purge, drain and dry at least one part of the buffer member.

In another example embodiment, the buffer member may be pressurised by the gas flow.

In such an example embodiment, the overflow manifold is then fluidically connected to the gas transfer pipe, on one side, and to the gas injection port of the buffer member, on the other.

According to another example embodiment, alternatively or additionally, the fluid transfer system may include a valve sized according to a desired pressure and/or controlled according to a target pressure.

According to another advantageous option, the fluid transfer system is configured to compensate a length variation of the liquid transfer pipe.

The length variation of the liquid transfer pipe is due to an axial deformation (expansion or contraction), i.e. according to a length of the pipe.

For illustration purposes, in operation with LNG, the fluid in the liquid transfer pipe is preferably maintained at a temperature between −160° C. and −140° C., therefore the pipe is at a temperature between about −160° C. and −140° C. However, when the fluid flow is initiated in the pipe, the liquid transfer pipe is at ambient temperature at the start of the operation. On account of the substantial cooling, the liquid transfer pipe contracts, and therefore reduces in length. However, the gas transfer pipe is not subjected to the same contraction. Consequently, the liquid transfer pipe reduces in length relative to the gas transfer pipe surrounding it.

Immobilising the liquid transfer pipe relative to the gas transfer pipe would generate excessive stress to ensure pipe integrity, and/or would involve very high costs.

It is therefore advantageous that the fluid transfer system be configured to compensate such length variations.

In an example embodiment, the liquid transfer pipe includes an incident section equipped with an endpiece, and a receiving section, forming a protective sleeve, wherein the endpiece is inserted.

Thus, according to the deformation of the liquid transfer pipe, the endpiece is pushed more or less deeply into the receiving section.

In an example embodiment, the buffer member is configured to glide relative to at least one from among the incident section and the receiving section, i.e. slide relative to the incident section and/or the receiving section.

The buffer member then acts as a ring which may move (for example move up or down) relative to the incident section, while being tight in rotation.

Optionally, the buffer member is attached, fastened, to at most one from among the incident section and the receiving section.

Thus, the buffer member is configured to compensate a deformation of the liquid transfer pipe, in particular by producing a junction between the incident section and the receiving section, by longitudinal sliding.

This may simplify the design of extra-long pipes, for example a natural gas pipeline.

However, according to another embodiment, the buffer member could be an axially floating ring.

In an example embodiment, the system described here may produce reverse leaks, i.e. where gaseous fluid may be reliquefied. Such a system is then configured to withstand an overpressure in both directions.

The inlets and outlets described here then have their functions reversed. For example, the fluid inlet configured to introduce fluid, from the liquid transfer pipe, into the buffer member, then serves to extract fluid from the buffer member to the liquid transfer pipe. Likewise, the fluid outlet configured to extract fluid from the buffer member to the gas transfer pipe, then serves to introduce fluid, from the gas transfer pipe, into the buffer member.

Such a fluid transfer system including two concentric pipes makes it possible for example to offer the following options:

gas transfer for loading or offloading a gaseous product;
protection (inerting) of a tank, upstream or downstream from the system;
insulation ("pipe in pipe");
protection (referred to as "boil off protection"), i.e. a gas is applied on the surface of a liquefied gas and thus prevents its liquefaction by creating a gaseous head-space;
leak control: by applying a permanent vacuum in the gas transfer pipe, it is possible to control and/or analyse an optional introduction of gas into the buffer member and thus check whether there is a leak in the system which could come from the liquid transfer pipe.

The invention also relates, according to another aspect, to a swivel joint device which includes a fluid transfer system including all or some of the features described above.

For example, the swivel joint device includes a first, so-called fixed, annular part and a second annular part rotatable about an axis of rotation X and relative to said first fixed annular part.

The swivel joint device generally has an internal space defined by an internal surface of the first fixed annular part.

The swivel joint device includes a transfer pipe which enters via the first fixed annular part of the swivel joint device and opens out of the swivel joint device via an outlet coupling connected to the second mobile annular part.

A flow thus passes through the swivel joint device by entering the first fixed annular part via the transfer pipe and outflowing via the second mobile annular part via the outlet coupling.

Here, the transfer pipe which enters the swivel joint device includes at least the gas transfer pipe of the fluid transfer system, forming a gas inlet in the swivel joint device, and the second mobile part includes the outlet coupling which forms a gas outlet of the swivel joint device.

In an example embodiment, the liquid transfer pipe of the fluid transfer system is disposed in the internal space of the swivel joint device.

Such a swivel joint device thus simultaneously enables liquid transfer and gas transfer by ensuring the rotation along the vertical axis (X) and the sealing of said circuits.

In an example embodiment wherein the liquid transfer pipe includes an incident section and a receiving section, one of the incident section or the receiving section may be fastened to the second mobile annular part and/or the other of the incident section or the receiving section may be fastened to the first fixed annular part.

For example, the second annular part is rotatable relative to the first annular part by means of a hinge member, at least partially inserted between the first annular part and the second annular part.

For example, the hinge member includes a bearing member.

In an example embodiment, the swivel joint device includes a fluid injection port configured to inject a fluid into the hinge member.

In an example embodiment, the swivel joint device includes at least one manifold configured to inject fluid into the hinge member via the fluid injection port.

Similarly, a fluid may be injected on a barrier which is located outside the hinge member, which encompasses the hinge member, and the barrier may be pressurised, for example at a pressure of 40 bar or 50 bar, optionally thanks to a manifold, and which will for example prevent seawater from entering (sea spray, rain, waves if floating system such as a buoy, etc).

According to another advantageous option, the manifold may be a manifold for oil or other lubricant (such as for example glycols or ethers of petroleum which make it possible to lubricate at −160° C.), the oil or other lubricant being chosen so as not to set at the operating temperature (about −160° C. maximum).

According to an alternative example embodiment if a bearing member is too complex to lubricate, the hinge member may include at least one friction pad.

In an example embodiment, the swivel joint device includes an insulating sheath.

For example, the insulating sheath surrounds at least partially the first fixed annular part and/or the second mobile annular part.

For example, the insulating sheath includes a double-wall structure.

For example, the insulating sheath includes an insulating coating.

The insulation of the external structure is for example ensured at locations considered to be critical by the presence of a double wall which may include any type of insulating material and/or be put under vacuum inside the double wall.

An aim of such insulation is that of limiting heat exchanges which may cool the hinge member or promote heating of the liquid flow.

The invention also relates, according to another aspect, to a stack of swivel joint devices including at least two swivel joint devices, at least a first of the swivel joint devices of the stack of swivel joint devices being as described above.

The invention furthermore relates, according to a further aspect, to a fluid exploitation installation which includes at least:

a liquefaction unit,
a storage and/or transport entity,
a first swivel joint device including a fluid transfer system as described above, the first swivel joint device being connected by the outlet coupling to the liquefaction unit and by the gas transfer pipe to the storage and/or transport entity, the liquid transfer pipe of the fluid transfer system connecting the liquefaction unit to the storage and/or transport entity, and
at least a second swivel joint device, which includes an inlet pipe into the second swivel joint device which is connected to a pipe of an underwater pipe network to extract natural gas, and an outlet coupling which is connected to the liquefaction unit.

For example, the second swivel joint device may be a high-pressure high-temperature swivel joint device (annotated HPHTS).

In an example embodiment, the installation includes a stack of swivel joint devices including at least two swivel joint devices, the stack of swivel joint devices including at least the first swivel joint device and the second swivel joint device.

In an example embodiment, the installation furthermore includes a ship, and at least one from among the first swivel joint device or the second swivel joint device is disposed on the ship.

BRIEF DESCRIPTION OF THE FIGURES

The invention, according to one example embodiment, will be better understood and its advantages will become more apparent upon reading the following detailed description, given by way of example and in no way limiting, with reference to the appended drawings wherein.

DETAILED DESCRIPTION

Figure 1:
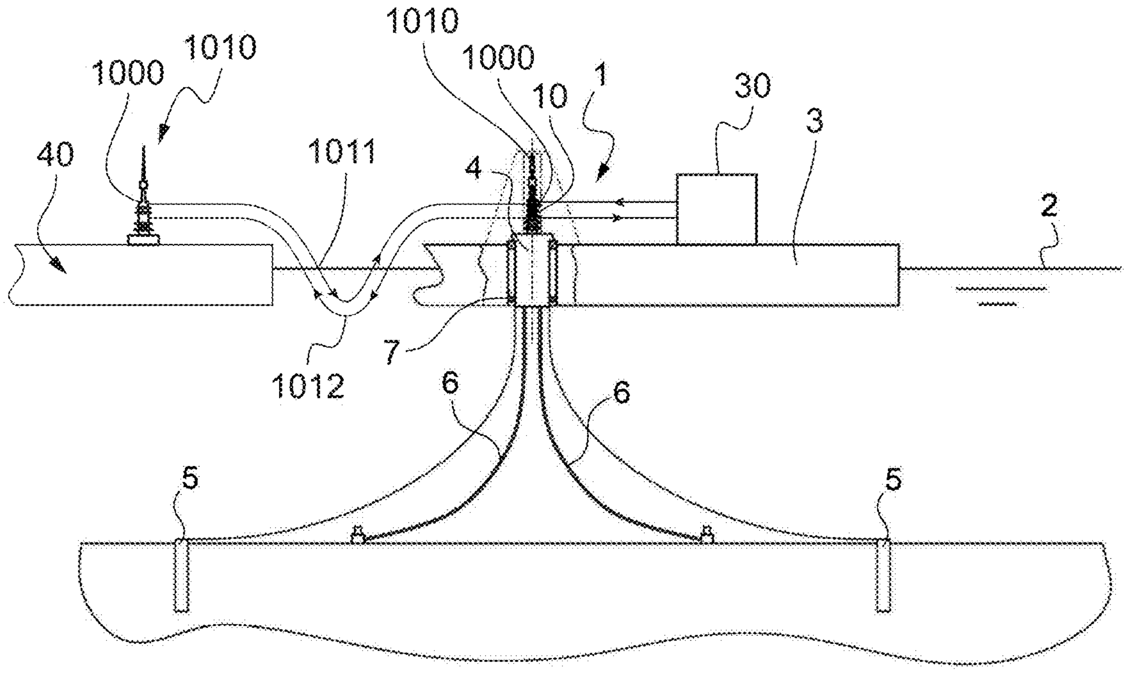
FIG. 1 represents schematically and partially a fluid exploitation installation on an offshore platform, provided with a ship, a mooring turret, an underwater pipe network allowing fluidic communication for transferring the fluid between the seabed and the ship, and at least one swivel joint device ensuring sealing between the ship and the turret and fluid transfer integrity.

FIG. 1 illustrates a fluid exploitation installation 1 on an offshore platform, allowing the exploitation of offshore hydrocarbon fields 2.

This installation 1, also known as a floating production storage offloading unit (FPSO), may be provided with a ship 3 which is mobile, on account of its environment formed by the sea 2, and a mooring turret 4 which is geostationary and about which the ship 3 is mobile.

The mooring turret 4 may for example be mechanically secured to the seabed 2 via underwater anchors 5.

The ship 3 may be mobile relative to the turret 4 via a bearing mechanism 7.

The installation 1 may be provided with pipes 6 which form an underwater pipe network allowing a fluidic communication for a transfer of fluid (for example: water, methanol, detergents, etc.) between the mooring turret 4 and the seabed.

The fluid circulating in the pipes 6 may also come from a subfloor of the sea 2.

The fluid may then be processed and purified before the gas can be liquefied.

For this, the fluid exploitation installation 1 includes a liquefaction unit 30, which may be located on the ship 3 as illustrated here, or be adjoined to it on a mooring alongside floating unit for example.

The liquefied fluid may then be pushed towards a storage and/or transport entity 40, for example via a mooring buoy.

A storage and/or transport entity 40 is for example an export gas carrier (for example a shuttle methane carrier), which may be moored in tandem, or by a mooring buoy, to subsequently transfer the fluid to a refinery on land, or even directly to a specific site, on land.

For example, the storage and/or transport entity 40 may be:

- Either moored alongside (in tandem) or in-line (referred to as "piggy back") and connected by floating hoses 1012 for LNG and floating hoses 1011 for gas transfer;
- Either moored and connected to a buoy (not illustrated) by optionally coaxial, floating or underwater hoses, which may for example be either floating between two waters, or embedded;

According to another example, the ship may also supply a refinery on land or even directly a specific site (not illustrated).

The installation 1 includes a swivel joint device 10 ensuring:

sealing between the ship 3 and the mooring turret 4, and fluid transfer integrity.

The swivel joint device 10 may be formed from a swivel joint or disposed in a stack of such joints.

At least one swivel joint device 10, for example an HPHTS swivel joint device, may therefore be located on the ship 3 in order to extract the NG and send it to the liquefaction unit 30, whereas at least another swivel joint device may be disposed to transfer the LNG from the liquefaction unit 30 to the storage and/or transport entity 40, and to reroute a gas to the liquefaction unit 30. The installation 1 may then in particular include at least one stack 1010 of swivel joint devices including at least two swivel joint devices.

Figure 2:
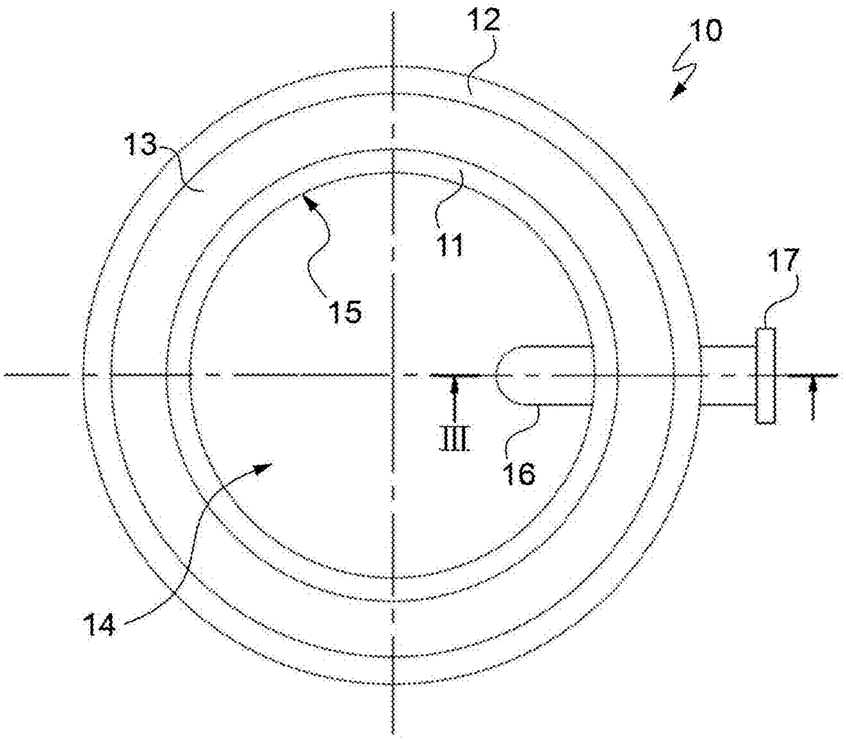
FIG. 2 is a schematic top view of a swivel joint device, as used for example in the installation illustrated in FIG. 1.

As illustrated in FIG. 2, such a swivel joint device 10, for example HPHTS, is overall annular and includes a first so-called fixed annular part 11, which is generally configured to be secured to the mooring turret 4, and/or to the mooring anchors 5, as well as a second so-called mobile annular part 12, which is configured to be secured to the ship 3.

In the example described here, the second annular part 12 is rotatable relative to the first annular part 11 by means of a bearing member 13 at least partially inserted between the first annular part 11 and the second annular part 12.

The bearing member is for example protected by seals.

The swivel joint device 10 has an internal space 14 defined here by an internal surface 15 of the first annular part 11.

The swivel joint device 10 furthermore includes a transfer pipe 16 connected, directly or indirectly, to at least one of the underwater pipes 6.

The transfer pipe 16 enters the first annular part 11 via the internal space 14 and opens out of the swivel joint device 10 via an outlet coupling 17. The outlet coupling 17 is for example connected to a processing and/or liquefaction unit (not shown) in order to separate and then liquefy the gas and subsequently transfer the liquefied gas to a shuttle tanker or a storage unit on land.

A flow thus passes through the swivel joint device 10 by entering the first fixed annular part 11 via the transfer pipe and outflowing via the second mobile annular part 12 via the outlet coupling.

Figure 3:
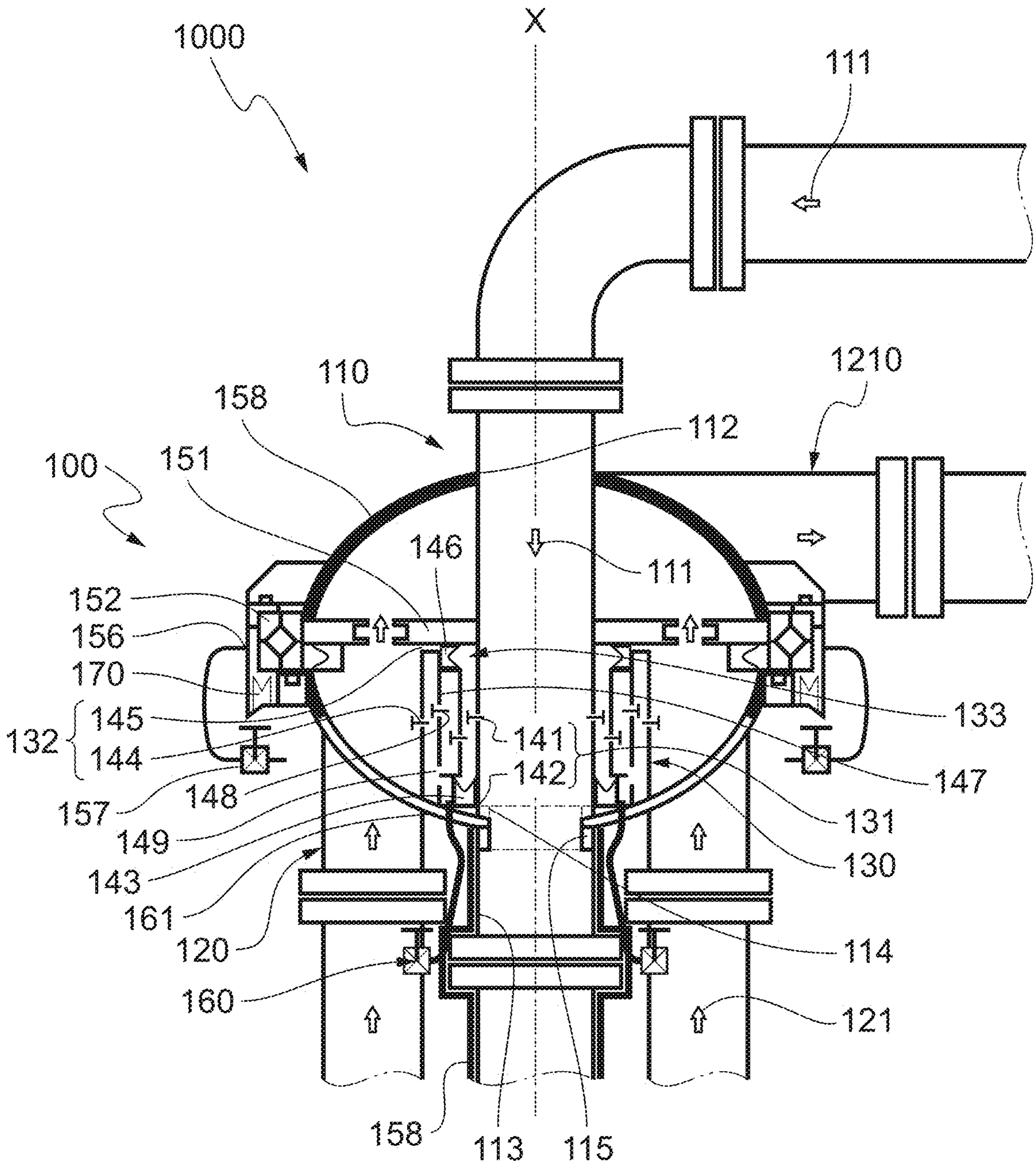
FIG. 3 represents a fluid transfer system according to a first embodiment.

FIG. 3 represents a fluid transfer system 100 according to a first embodiment of the invention.

Figure 4:
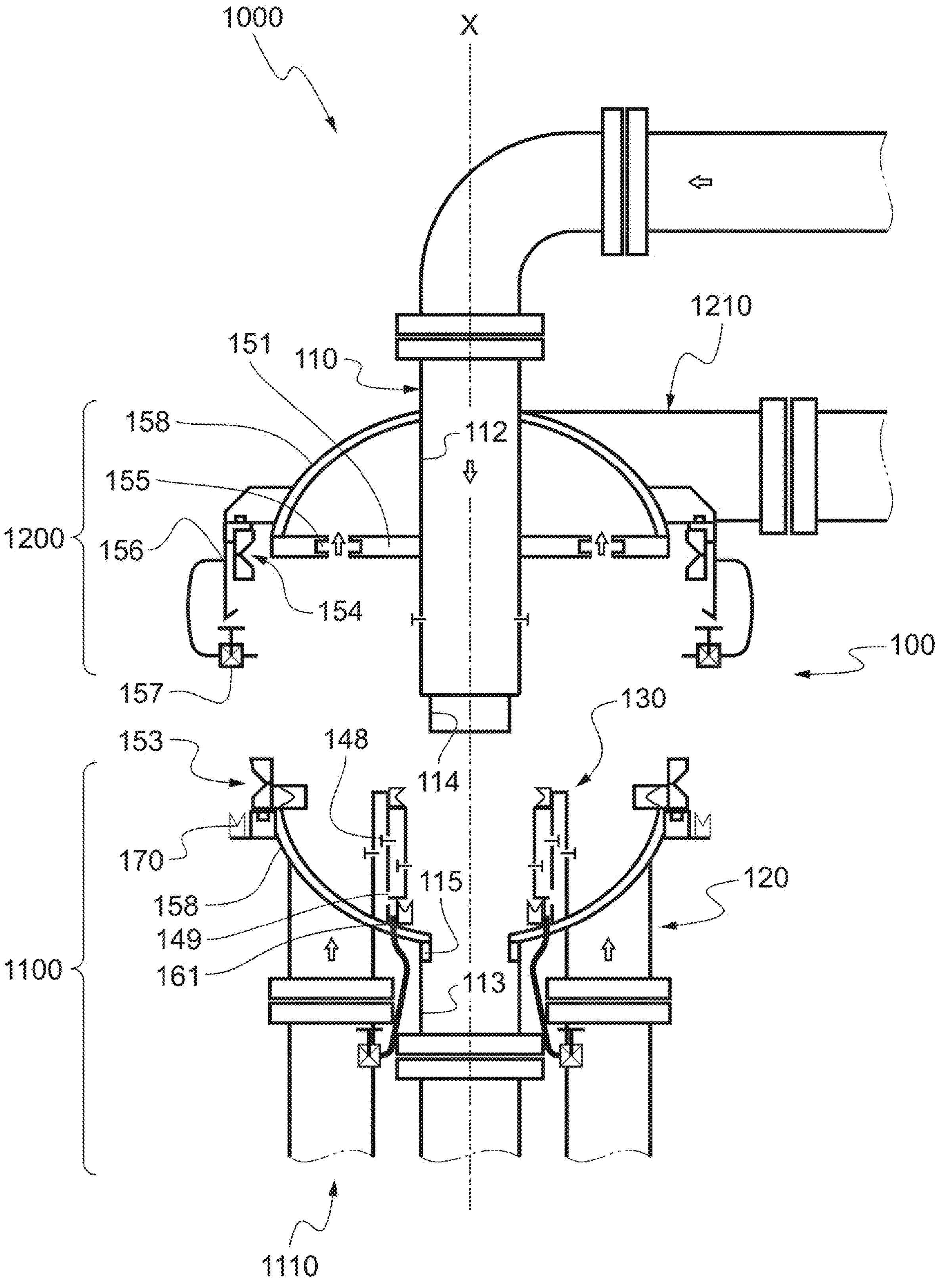
FIG. 4 represents the system of FIG. 3, partially exploded.

FIG. 4 represents the system of FIG. 3, partially exploded.

The fluid transfer system 100 includes a liquid transfer pipe 110, configured to carry a liquefied gas (LG).

The liquid transfer pipe 110 is here a pipe with a circular cross-section.

The pipe with a circular cross-section then includes a cylindrical wall delimiting an internal volume of the pipe wherein a fluid flow may flow, such as for example a liquefied gas flow represented schematically by the arrow 111.

The liquid transfer pipe 110 includes here two sections, including an incident section 112 and a receiving section 113.

The incident section 112 and the receiving section 113 are partially imbricated in one another, thus allowing a length variation of the liquid transfer pipe 110, a length variation that may be induced according to the temperature (expansion) and the pressure (hydrostatic end force). The length represents here a dimension along a longitudinal axis X, illustrated in FIG. 3. The longitudinal axis (X) corresponds here to an average fluid flow line in the liquid transfer pipe 110. In the case of cylindrical pipe with circular cross-section, it consists of an axis of revolution of the pipe.

As seen more clearly in FIG. 4 for example, the incident section 112 includes an endpiece 114, forming a part of reduced cross-section of the incident section 112, configured to be inserted into the receiving section 113, which thus forms a protective sleeve.

Such a protective sleeve may for example be configured to protect seals and/or journal bearings against erosion which may be due to turbulence of a mixture of gas bubbles and liquid in the liquid transfer pipe 110. This sleeve may be for example guided by a journal bearing 115 disposed between the receiving section 113 and the endpiece 114.

According to the deformation of the liquid transfer pipe, the endpiece is pushed more or less deeply into the receiving section 113.

The liquid transfer pipe 110 is thus configured to adopt a retracted configuration wherein at least a part of the endpiece 114 is inserted into the receiving section 113 and the liquid transfer pipe 110 then has a first length, and a deployed configuration wherein the part of the endpiece is out of the receiving section 113 and the liquid transfer pipe 110 then has a second length, greater than the first length.

In the retracted configuration, at least half of a length of the endpiece 114 is preferably engaged in the receiving section 113, considering for example a working temperature under most difficult conditions, such as for example about 25 bar at −100° C.

Moreover, the incident section 112 may rotate relative to the receiving section 113, for example here along the axis X.

The fluid transfer system 100 also includes a gas transfer pipe 120.

The gas transfer pipe 120 is in particular configured to carry an evaporated portion of the liquefied gas, in particular to the liquefaction unit.

The gas transfer pipe 120 is here a pipe with an annular cross-section.

In other words, the pipe with an annular cross-section includes an internal cylindrical wall and an external cylindrical wall which surrounds the internal cylindrical wall, and a fluid may then flow in the pipe between the internal cylindrical wall and the external cylindrical wall.

In FIG. 3, a gas flow is represented by the arrow 121.

The gas flow is here represented schematically in the opposite direction to that of the liquid flow represented schematically by the arrow 111. However, the gas flow could be in the same direction as that of the liquid, depending on a context and/or a desired application.

In the present example embodiment, the gas transfer pipe 120 surrounds the liquid transfer pipe 110.

Furthermore, the liquid transfer pipe 110 and the gas transfer pipe 120 are concentric.

The fluid transfer system 100 furthermore includes a buffer member 130.

The buffer member 130 is in particular configured to transfer an evaporated portion of liquefied gas circulating in the liquid transfer pipe 110, from the liquid transfer pipe 110 to the gas transfer pipe 120.

The buffer member 130 thus makes it possible to separate gas, from liquid leaks which could be evaporated inside the liquid transfer pipe 110, and return this gas to a liquefaction unit via the gas transfer pipe 120.

The buffer member 130 is here disposed between the liquid transfer pipe 110 and the gas transfer pipe 120 and surrounds at least partially the liquid transfer pipe 110.

In other words, the buffer member 130 is here annular and surrounds the liquid transfer pipe 110.

The buffer member 130 thus contributes to thermal insulation of the liquid transfer pipe 110 and to the collection of any leaks that may arise therefrom.

The fluid transfer system 100 thus makes it possible to contribute to thermal insulation of the liquid transfer pipe 110 forming a central channel intended for liquefied gas, using the gas transfer pipe 120 to surround it, and makes it possible to separate the two flows (liquid and gas) by an intermediate volume formed by the buffer member 130.

The gas transfer pipe 120 encases the liquid transfer pipe 110 and forms a thermal barrier and a gas/liquid differential pressure damper.

Evaporated gas from the liquid may circulate in the buffer member 130 and escape into the gas transfer pipe 120.

The gas transfer pipe 120 is then configured to recover and circulate an evaporated portion, or fraction, of the liquid.

The buffer member 130 includes, on one hand, a fluid inlet 131 and, on the other, a fluid outlet 132.

The fluid inlet 131 is configured to introduce fluid into the buffer member 130, from the liquid transfer pipe 110.

For example, the fluid inlet 131 may include at least one orifice formed in the wall of the liquid transfer pipe 110 and opening into the buffer member 130.

The fluid inlet 131 may in particular include several orifices disposed around the liquid transfer pipe 110.

In the present example embodiment, the fluid inlet 131 includes at least one safety valve 141.

It may in particular include several safety valves disposed around the liquid transfer pipe 110.

The safety valve 141 is for example configured to balance an overpressure between the liquid transfer pipe 110 and the buffer member 130.

Thus, any overpressure in the liquid transfer pipe 110 is released in the buffer member 130 by at least one safety valve 141 calibrated accordingly.

Here, the safety valve 141 is disposed in the wall of the liquid transfer pipe 110, in particular in the present example embodiment, in the incident section 112, and for example in an orifice of the fluid inlet 131.

Alternatively or additionally, as illustrated here, the fluid inlet 131 may also include a leak passage 142, for example a passage bypassing a dynamic sealing member 143 described hereinafter.

A leak passage refers here to an interstice formed by a contact between parts.

In the present example, as seen more clearly in FIG. 4, when the incident section 112 is inserted into the receiving section 113, a contact between the endpiece 114, the journal bearing 115 and the receiving section 113 may allow a fluid leak.

To nonetheless control such a leak, the fluid transfer system 100 includes for example a dynamic sealing member 143.

In this example, the dynamic sealing member 143 includes a piston seal.

The dynamic sealing member 143 is for example here disposed in the buffer member 130, and for example around a junction between the incident section 112 and the receiving section 113, for example facing an interstice between the buffer member 130 and the incident section 112.

The fluid outlet 132 is configured to extract fluid from the buffer member 130, to the gas transfer pipe 120.

For example, the fluid outlet 132 may include at least one orifice formed in the wall of the gas transfer pipe 120, in particular the internal cylindrical wall, and opening into the buffer member 130.

It may in particular include several orifices disposed around the gas transfer pipe 120, in particular the internal cylindrical wall.

In the present example embodiment, the fluid outlet 132 includes at least one exhaust valve 144.

It may in particular include several exhaust valves disposed around the gas transfer pipe 120, in particular the internal cylindrical wall.

The exhaust valve 144 is for example configured to balance an overpressure between the buffer member 130 and the gas transfer pipe 120.

Thus, any overpressure in the buffer member 130 is released in the gas transfer pipe 120 by at least one exhaust valve 144 calibrated accordingly.

Here, the exhaust valve 144 is disposed in the internal cylindrical wall of the gas transfer pipe 120, in particular in an orifice of the fluid outlet 132.

Alternatively or additionally, as illustrated here, the fluid outlet 132 may also include a leak passage 145, for example a passage bypassing a dynamic sealing member 146 described hereinafter.

In the present example, as seen more clearly in FIG. 4, the fluid transfer system 100 includes a separating partition 151 against which the buffer member 130 abuts.

A contact between the separation partition 151 and the buffer member 130 may allow a fluid leak to pass through.

To limit such a leak, the fluid transfer system 100 includes for example a dynamic sealing member 146, for example here a facial seal.

The dynamic sealing member 146 is for example here disposed in the buffer member 130, and against the separating partition 151.

In practice, the fluid transfer system 100 is preferably configured so that a liquid flow is downward, i.e. according to gravity, as represented schematically by the arrow 111, and so that a gas flow is upward, i.e. against the fluid flow, as represented schematically by the arrow 121. It is then advantageous that the fluid inlet 131 of the buffer member be offset relative to the fluid outlet 132 along the longitudinal axis (X) of the liquid transfer pipe 110.

As represented schematically here, at least one part of the fluid inlet 131 in the buffer member (here the leak passage 142) is disposed at a lower height than a height of at least one part of the fluid outlet 132 (here the leak passage 145) to ensure a lower level for liquid and a higher level for gas.

The buffer member 130 here includes an internal volume 133 forming a chamber between the liquid transfer pipe 110 and the gas transfer pipe 120.

In the present example embodiment, the buffer member 130 includes at least one inner wall 147 forming a labyrinth for a fluidic flow in the buffer member.

Here, the inner wall 147 divides the internal volume 133 of the buffer member 130 into at least two chambers, and even here three chambers, the fluid inlet 131 being disposed in a first of the chambers, and the fluid outlet 132 being disposed in a second of the chambers; here a third chamber being formed between the first chamber and the second chamber.

For example, the inner wall 147 is configured to allow a passage of fluid from the first chamber to the second chamber.

In the present example embodiment, the inner wall 147 includes at least one balancing valve 148 disposed in an orifice, and a valve-free orifice 149.

The balancing valve 148 is for example configured to balance a pressure between the two chambers of the buffer member 130.

The safety valve 141 is for example configured to limit to 5 bar an overpressure in the liquid transfer pipe 110 relative to the buffer member 130. For example, if dynamic sealing members 143, 146 are tight and liquid has entered the buffer member, this liquid would evaporate and increase the pressure in the buffer member without however exceeding a calibration of a balancing valve which would release the excess pressure from the buffer member to the liquid transfer pipe 110.

In the present example embodiment, the balancing valve may be calibrated at a few bar and mounted in the opposite direction of the safety valve 141, or otherwise the at least one valve-free orifice 149, of relatively small cross-section, may be disposed at the bottom (according to the direction of gravity) of the wall 147. Such an orifice 149 is intended to draw fluid transfers in both directions without reducing a mechanical rigidity of the buffer member 130, and to help the pressure inside a chamber not to be excessively greater than that present outside to prevent, at least in part, permanent deformations of the inner wall 147.

Here, at least one balancing valve 148 is formed in a part of the inner wall 147 separating the first chamber from the third chamber and at least one balancing valve 148 is formed in another part of the inner wall 147 separating the third chamber from the second chamber.

As seen more clearly according to FIG. 4 in the present example embodiment, the buffer member 130 is here delimited, on one side, by the liquid transfer pipe 110 and, on the other, by the gas transfer pipe 120, and shares a common wall with each.

However, the buffer member could include its own walls on either side, which would then be adjacent, on one side, to the internal wall of the gas transfer pipe and, on the other side, to the wall of the liquid transfer pipe.

At least the incident section 112 has here a rotatability relative to the buffer member 130.

The fluid transfer system is here configured to compensate a length variation of the liquid transfer pipe 110.

The length variation of the liquid transfer pipe is due to an axial deformation (expansion or contraction, optionally combined with the hydrostatic end force), i.e. according to a length of the pipe, along the axis X.

For illustration purposes, in operation with LNG, the fluid in the liquid transfer pipe is preferably maintained at a temperature between −160° C. and −140° C. Therefore the pipe is at a temperature between about −160° C. and −140° C. However, when the fluid flow is initiated in the pipe, the liquid transfer pipe is initially at ambient temperature. On account of the substantial cooling, the liquid transfer pipe contracts, and therefore reduces in length.

However, the gas transfer pipe is not subjected to the same contraction. Consequently, the liquid transfer pipe reduces in length relative to the gas transfer pipe surrounding it.

Immobilising the liquid transfer pipe relative to the gas transfer pipe would generate excessive stress to ensure pipe integrity, and/or would involve very high costs.

It is therefore advantageous that the fluid transfer system be configured to compensate such length variations.

For this, in the present example embodiment, the buffer member 130 is configured to glide relative to at least one from among the incident section 112 and the receiving section 113, i.e. slide relative to the incident section and/or the receiving section.

The buffer member 130 then acts as a ring which can move in translation, vertically, while being tight in rotation, in particular here about the axis X.

As seen more clearly in FIG. 4, the buffer member 130 is fastened to at most one from among the incident section and the receiving section, in this case to the receiving section 113. Thus, in the present example embodiment, the buffer member 130 is configured to glide relative to the incident section 112, and the receiving section 113 slides jointly with the buffer member 130 relative to the incident section 112.

The buffer member is thus configured to compensate a deformation of the liquid transfer pipe, in particular by producing a junction between the incident section 112 and the receiving section 113, by longitudinal sliding along the longitudinal axis (X).

In the present example embodiment, the buffer member includes a gas injection port 161 configured to inject a gas, in particular under pressure, into the buffer member, for example in at least one chamber of the buffer member.

The fluid transfer system may then include at least one overflow manifold 160 configured to inject gas into the buffer member via the gas injection port 161.

The overflow manifold 160 thus connects the buffer member with, for example, a pressurisation system and/or the gas flow. In the latter case, the overflow manifold 160 is fluidically connected to the gas transfer pipe 120, on one side, and to the gas injection port 161 of the buffer member, on the other side.

For example, the seal of the dynamic sealing member 143 may be actuated by pressure through at least one of the valve-free orifices 149 of the internal wall 147.

The fluid transfer system 100 may include the pressurisation system (represented according to a particular embodiment in FIG. 14) which then includes a gas.

The gas of the pressurisation system is for example an inert gas.

It consists for example of an inert and dry gas in which the boiling point at the pressure of use is lower than that of the liquid gas contained in the liquid transfer pipe 110.

For example, the gas of the pressurisation system is configured to be in a gaseous state at a temperature greater than or equal to about −160° C.

For example, the gas of the pressurisation system is chosen to be in the gaseous state at a temperature slightly lower than −160° C. at atmospheric pressure when LG is Methane, at about −90° C. when LG is Ethane, −42° C. for Propane and −33° C. for Ammonia.

For example, the gas includes at least one gas from among: Nitrogen, Argon, Helium, or Methane, or any mixture thereof.

For example, the pressurisation system may include a pressurised dry gas cylinder.

For example, the fluid transfer system 100 may also include a pressure regulator (not shown) configured to regulate a predefined pressure in the buffer member 130.

As also represented schematically in FIGS. 3 and 4, the fluid transfer system described above is here part of a swivel joint device 1000.

The swivel joint device 1000 includes a first, so-called fixed, annular part 1100 (see FIG. 4) and a second annular part 1200 rotatable about the axis of rotation (X) and relative to said first fixed annular part 1100.

The swivel joint device generally has an internal space defined by an internal surface of the first fixed annular part.

The swivel joint device 1000 includes a transfer pipe 1110 which enters the first fixed annular part 1100, and opens via an outlet coupling 1210 connected to the second mobile annular part 1200.

A flow thus passes through the swivel joint device 1000 by entering the first fixed annular part 1100 via the transfer pipe 1110 and outflowing via the second mobile annular part 1200 via the outlet coupling 1210.

Here, the transfer pipe 1110 includes at least the gas transfer pipe 120 of the fluid transfer system 100, forming a gas inlet in the swivel joint device 1000, and the second mobile part 1200 includes the outlet coupling 1210 which forms a gas outlet of the swivel joint device 1000. As also seen in FIG. 4, the second mobile annular part 1200 includes here the separating partition 151.

Furthermore, the separating partition 151 includes at least one passage 155 allowing gas flowing from the gas transfer pipe 120 to move from the first fixed annular part 1100 to the second mobile annular part 1200 and thus pass through the swivel joint device 1000 and outflow via the outlet coupling 1210.

The liquid transfer pipe 110 of the fluid transfer system 100 is disposed in the internal space of the swivel joint device 1000.

Such a swivel joint device 1000 thus simultaneously enables liquid transfer and gas transfer by ensuring the rotation along the vertical axis (X) and the sealing of said circuits.

Furthermore, in the present example embodiment wherein the liquid transfer pipe 110 includes an incident section 112 and a receiving section 113, the incident section 112 is fastened to the second mobile annular part 1200 whereas the receiving section 113 is fastened to the first fixed annular part 1100.

For example here, the swivel joint device 1000 includes a hinge member 152, for example with bearings, which is at least partially inserted between the first annular part 1100 and the second annular part 1200, such that the second annular part 1200 is rotatable relative to the first annular part 1100.

For example here, the hinge member 152 includes a first part 153 rigidly connected to the first fixed annular part 1100 and a second part 154 rigidly connected to the second mobile annular part 1200, the second part 154 of the hinge member 152 being rotatable relative to the first part 153 of the hinge member 152.

The swivel joint device 1000 furthermore includes here a fluid injection port 156 configured to inject a fluid into the hinge member 152.

For example, the swivel joint device 1000 includes at least one manifold 157 configured to inject fluid into the hinge member 152 via the fluid injection port 156.

The manifold 157 may be a manifold for oil or other lubricant (such as for example glycols or ethers of petroleum which make it possible to lubricate at −160° C.), the oil or other lubricant being chosen so as not to set at the operating temperature (about −160° C. at the lowest).

The swivel joint device 1000 may furthermore include a protective environmental seal 170, referred to as "weather seal", i.e. a seal which protects from the marine environment. Such a seal is here configured to protect the hinge member 152.

In an example embodiment, the swivel joint device 1000 includes an insulating sheath 158. The insulating sheath surrounds at least partially the first fixed annular part and/or the second mobile annular part.

The insulating sheath includes here a double-wall structure.

The insulation of the external structure is for example ensured at critical locations by the presence of a double wall which may include any type of insulating material and/or be put under vacuum inside the double wall.

An aim of such insulation is that of limiting heat exchanges which may cool the hinge member 152 or promote heating of the liquid transfer pipe 110.

When there is a fluid flow, the liquid flows in the liquid transfer pipe 110, for example from top to bottom according to the embodiment illustrated in FIGS. 3 and 4.

A portion of the liquid that evaporates is introduced into the buffer member via the safety valve 141 and/or the leak passage 142, until balancing of the pressures between the buffer member and the liquid transfer pipe 110 is substantially ensured. Once in the first chamber, fluid may be introduced into the third chamber via at least one balancing valve 148 and/or at least one valve-free orifice 149, then into the second chamber via at least one other balancing valve 148 and/or at least one other valve-free orifice 149 communicating between the third chamber and the second chamber.

The fluid outflows from the buffer member 130 via at least the exhaust valve 144 and/or the leak passage 145. The leak passage 145 serves in particular during a temperature and pressure conditioning phase during a commissioning of the fluid transfer system 100.

The fluid inlet is for example secured by the at least one safety valve 141 to introduce fluid into the buffer member 130, from the liquid transfer pipe 110, whereas the fluid outlet is for example secured by the at least one exhaust valve 144, and optionally by the at least one balancing valve 148.

The fluid is then located in the gas transfer pipe 120, carried in the flow along the arrow 121.

In a swivel joint device 1000, the fluid then enters the mobile annular part 1200 via the passage 155 and subsequently outflows from the device via the outlet coupling 1210.

In the installation 1 of FIG. 1, the stack 1010 of swivel joint devices may for example include a first swivel joint device 1000 including such a fluid transfer system 100.

The first swivel joint device 1000 is then connected via the outlet coupling 1210 to the liquefaction unit 30 and via the gas transfer pipe 120 to the storage and/or transport entity 40.

The liquid transfer pipe 110 of the fluid transfer system 100 connecting the liquefaction unit 30 to the storage and/or transport entity 40.

The stack 1010 of swivel joint devices may also include a second of the swivel joint devices 10 which includes an inlet pipe 16 which is connected to a pipe 6 of an underwater pipe system to extract natural gas, and an outlet coupling 17 which is connected to the liquefaction unit 30.

For example, the second of the swivel joint devices 10 of the stack 1010 of swivel joint devices is a high-pressure high-temperature swivel joint device (annotated HPHTS).

Figure 5:
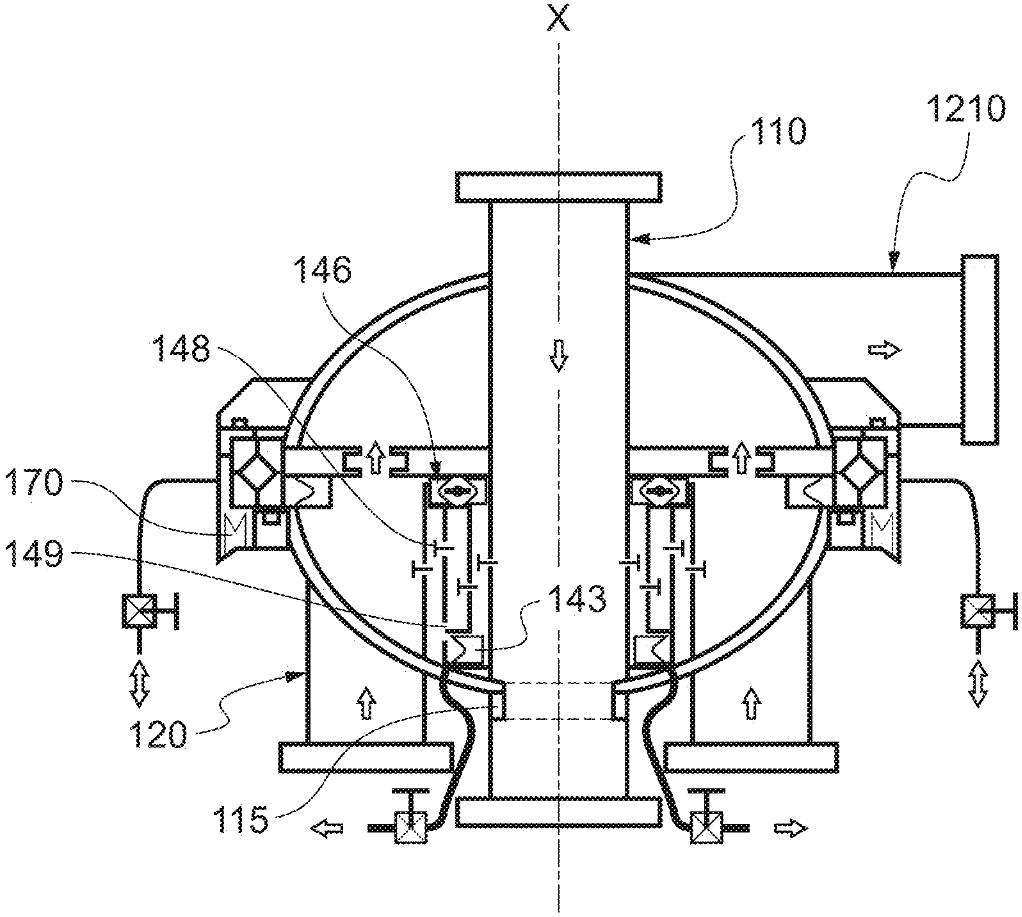
FIG. 5 represents a fluid transfer system according to a second embodiment.

FIG. 5 represents a fluid transfer system according to a second embodiment.

This embodiment differs from the preceding one in that the dynamic sealing member 143 includes here a seal in which a lug is disposed against the liquid transfer pipe 110.

This embodiment also differs in that the dynamic sealing member 146 includes here two facing seals, each seal including a pair of lips facing the pair of lips of the other seal, and a spreader disposed between the lips of the two seals.

In other words, the dynamic sealing member 146 includes a radial double seal with a spacer between the two to prevent the lips from collapsing.

Figure 6:
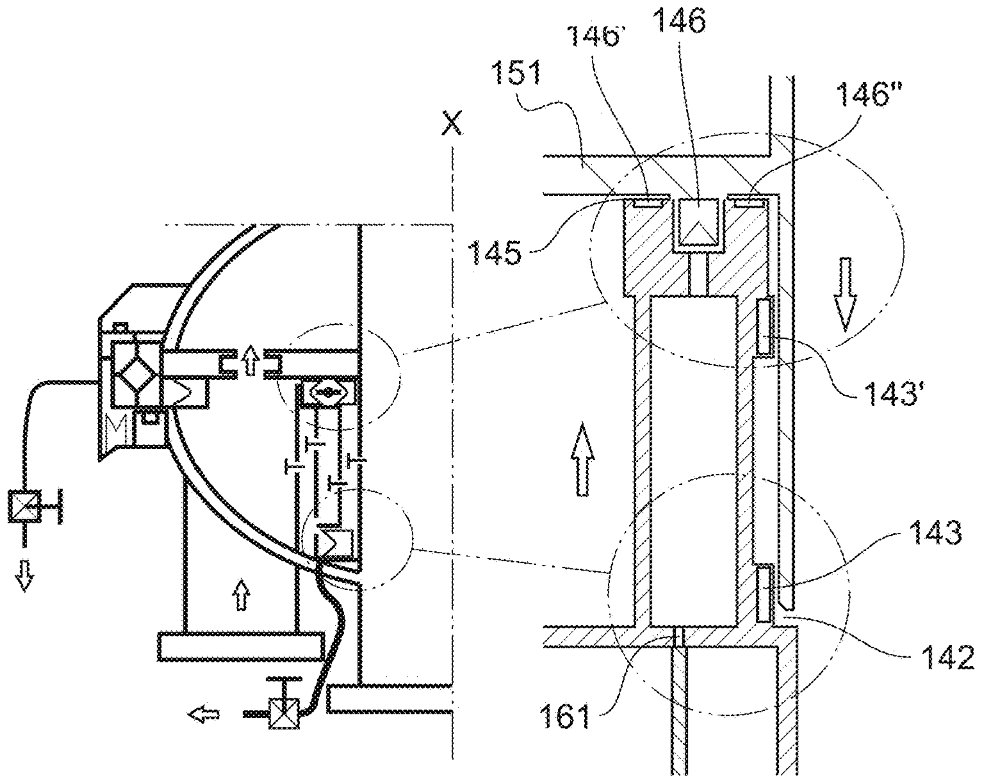
FIG. 6 represents a fluid transfer system according to a third embodiment.

FIG. 6 represents a fluid transfer system according to a third embodiment.

This embodiment differs from the preceding ones by the arrangement of the buffer member 130.

This is illustrated in comparison with a detail of FIG. 5 for easier visualisation.

In this example, the buffer member 130 is devoid of a valve, insofar as unclosed chambers cannot self-pressurise and the control system may be entirely outside the swivel joint device 1000 via the port 161.

The fluid inlet 131 only includes here the leak passage 142, and the fluid outlet only includes the leak passage 145.

The dynamic sealing member 143 includes here a journal bearing instead of a lip seal.

Another journal bearing 143' is furthermore present, the journal bearing 143 and the other journal bearing 143' delimiting between them a first chamber of the buffer member.

At the outlet, the dynamic sealing member 146 includes a lip seal in which the lips are oriented towards a chamber of the buffer member wherein pressurised gas may be injected via the port 161. Thus, here, a lug of the lip seal of the dynamic sealing member 146 is disposed against the separating partition 151.

On either side of the dynamic sealing member 146, the system includes two journal bearings 146', 146".

Figure 7:
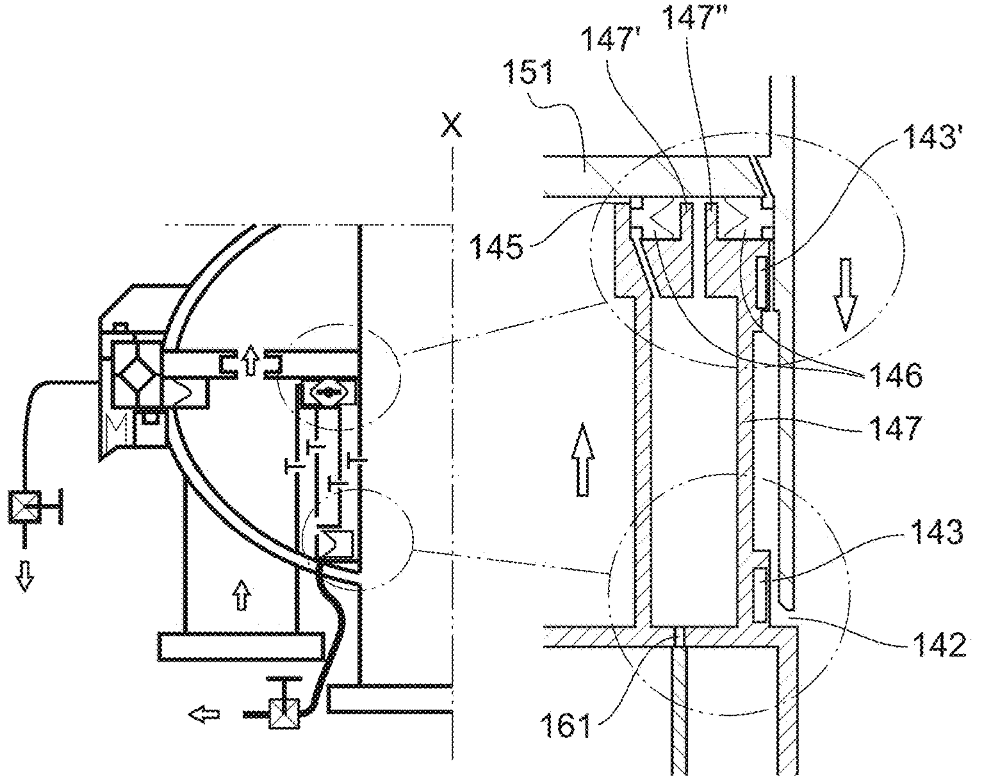
FIG. 7 represents a fluid transfer system according to a fourth embodiment.

FIG. 7 represents a fluid transfer system according to a fourth embodiment.

This embodiment is also illustrated in comparison with a detail of FIG. 5 for easier visualisation.

However, this embodiment differs from the preceding one by the leak passage 145 of the fluid outlet.

At the outlet, the dynamic sealing member 146 includes two facing lip seals.

The two lip seals are separated here by two edges 147', 147" of parts of the internal wall 147, the two edges 147', 147" delimiting between them a passage towards a chamber of the buffer member wherein pressurised gas may be injected via the port 161.

Figure 8:
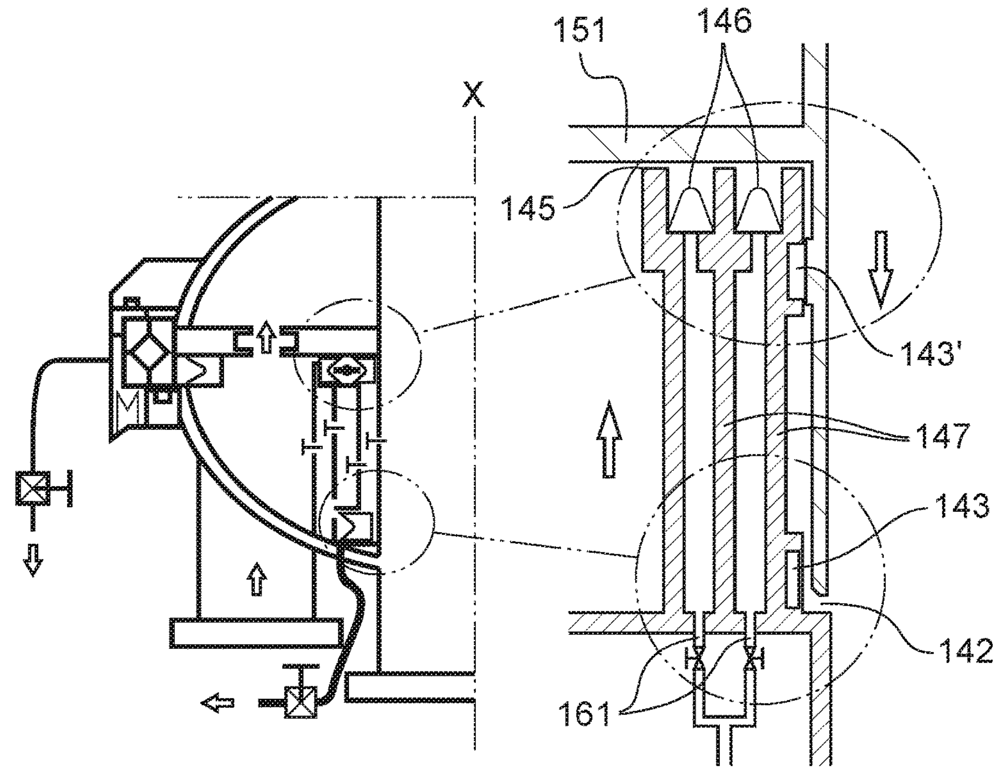
FIG. 8 represents a fluid transfer system according to a fifth embodiment.

FIG. 8 represents a fluid transfer system according to a fifth embodiment.

This embodiment is also illustrated in comparison with a detail of FIG. 5 for easier visualisation.

However, this embodiment differs from the preceding one by the presence of a third chamber, and by a configuration of the leak passage 145 of the fluid outlet.

In this example, the buffer member includes two injection ports 161, a first of the two ports configured to inject pressurised gas into the second chamber, and a second of the two ports configured to inject pressurised gas into the third chamber.

At the outlet, the dynamic sealing member 146 includes two lip seals, each lip seal being configured to be pressurised by one of the second chamber and the third chamber.

Furthermore, here, a lug of each the lip seals of the dynamic sealing member 146 is disposed against the separating partition 151.

Figure 9:
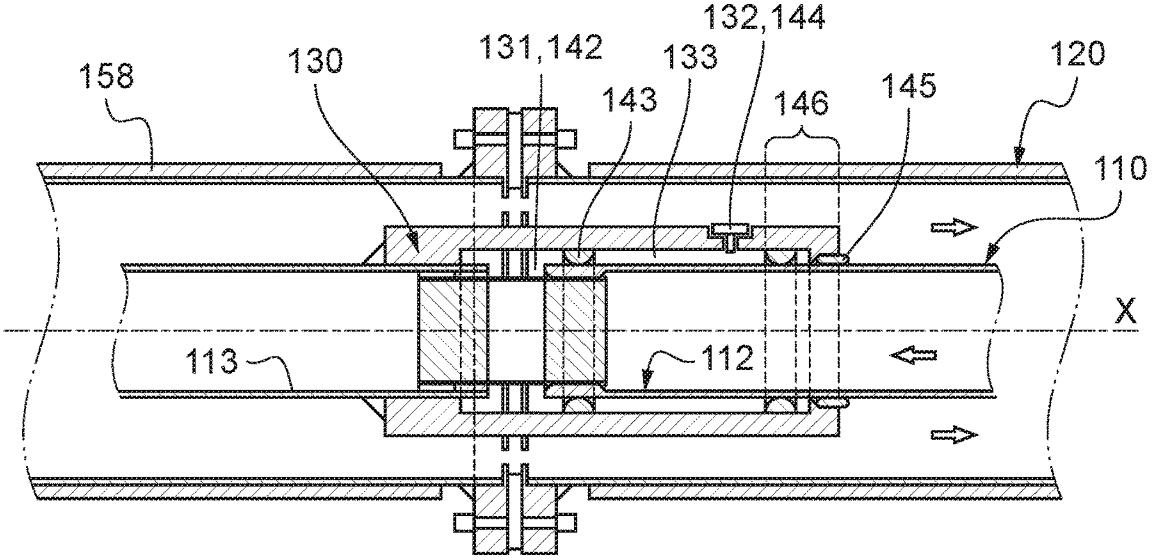
FIG. 9 represents a fluid transfer system according to a sixth embodiment forming a coaxial expansion joint.

FIG. 9 represents a fluid transfer system according to a sixth embodiment forming a coaxial expansion joint.

A coaxial expansion joint is for example configured for transferring LNG in the central passage to a user's storage and transferring evaporated liquid to a supplier's liquefaction/storage unit.

This type of joint makes it possible to absorb longitudinal differential movements between the liquid transfer pipe 110 and the gas transfer pipe 120.

It can operate in a horizontal position (orthogonal to gravity).

The gas transfer pipe 120 here has only a wall surrounding the liquid transfer pipe 110, such that a gas flows between a wall of the liquid transfer pipe and the wall of the gas transfer pipe 120.

Note also that the gas transfer pipe is formed here from two joined sections.

In such an embodiment, the buffer member 130 also forms a ring disposed around a junction of the incident section 112 and the receiving section 113 of the liquid transfer pipe 110.

The fluid inlet 131 in the buffer member 130 includes here the leak passage 142 formed at the junction between the incident section 112 and the receiving section 113, and bypassing the dynamic sealing member 143.

The fluid outlet 132 includes, on one side, the exhaust valve 144, and, on the other side, the leak passage 145 which is due to the presence of the dynamic sealing member 146, which includes for example a seal and a journal bearing.

Here, the buffer member only includes a chamber forming the internal volume 133, defined between the dynamic sealing member 143, the dynamic sealing member 146 and the exhaust valve 144. The buffer member is therefore here devoid of an inner wall 147 dividing the internal volume 133.

Figure 10:
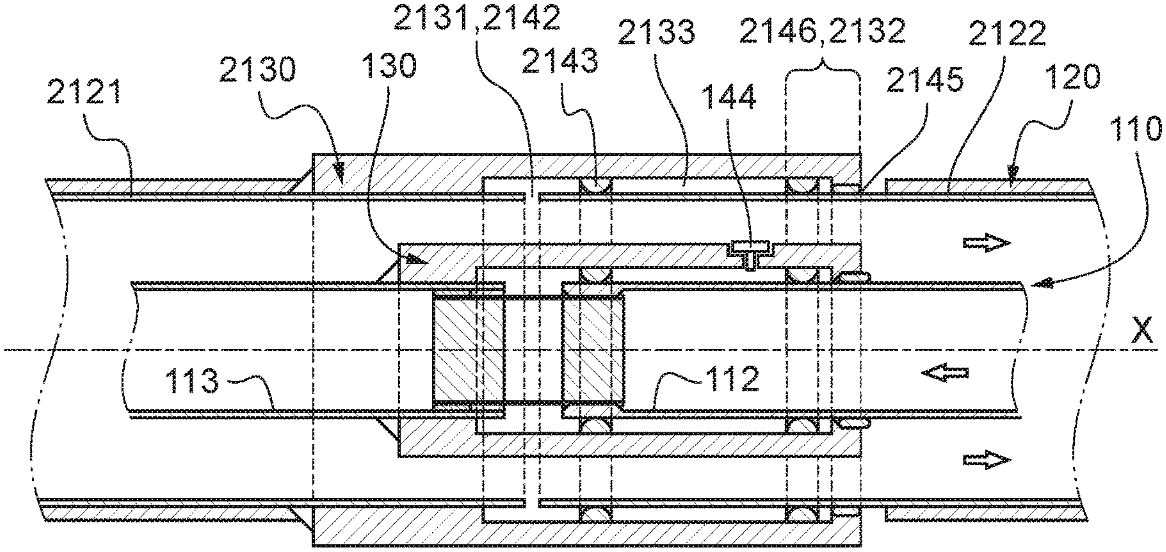
FIG. 10 represents a fluid transfer system according to a seventh embodiment forming a coaxial expansion joint according to a first variant.

FIG. 10 represents schematically a part of a fluid transfer system according to a seventh embodiment forming a coaxial expansion joint according to a first variant.

This embodiment differs from the preceding one in that it includes an additional buffer member 2130, surrounding the gas transfer pipe 120.

The additional buffer member is for example configured to guide and/or close the gas transfer pipe 120.

The additional buffer member 2130 is for example rigidly connected to a first section 2121 of the gas transfer pipe 120, and slidable relative to a second section 2122 of the gas transfer pipe 120.

This additional buffer member 2130 also includes an internal volume 2133, devoid of an inner wall 147, such that it includes a single chamber.

A fluid inlet 2131 in the internal volume includes here a leak passage 2142 formed by a bypass of a dynamic sealing member 2143 including here a seal.

In a case of integration of the system part represented in a fluid transfer system, a fluid outlet 2132 includes a leak passage 2145 which is due to the presence of a dynamic sealing member 2146, which includes for example here a seal and a journal bearing.

The internal volume 2133 is thus delimited on either side by the dynamic sealing member 2143 and the dynamic sealing member 2146.

This representation does not account for the mechanical arrangement required for the recovery of the hydrostatic end forces generated by the fluid pressures.

This type of embodiment could accept small angles of rotation between the two sections insofar as the pressure and temperature constraints may cause them in sections along sinuous routes.

In a case of integration of the system part represented into another system, for example to form a connector to join two concentric pipes, it may be preferable to avoid the leak passage 2145 and render the dynamic sealing member 2146 tight.

Figure 11:
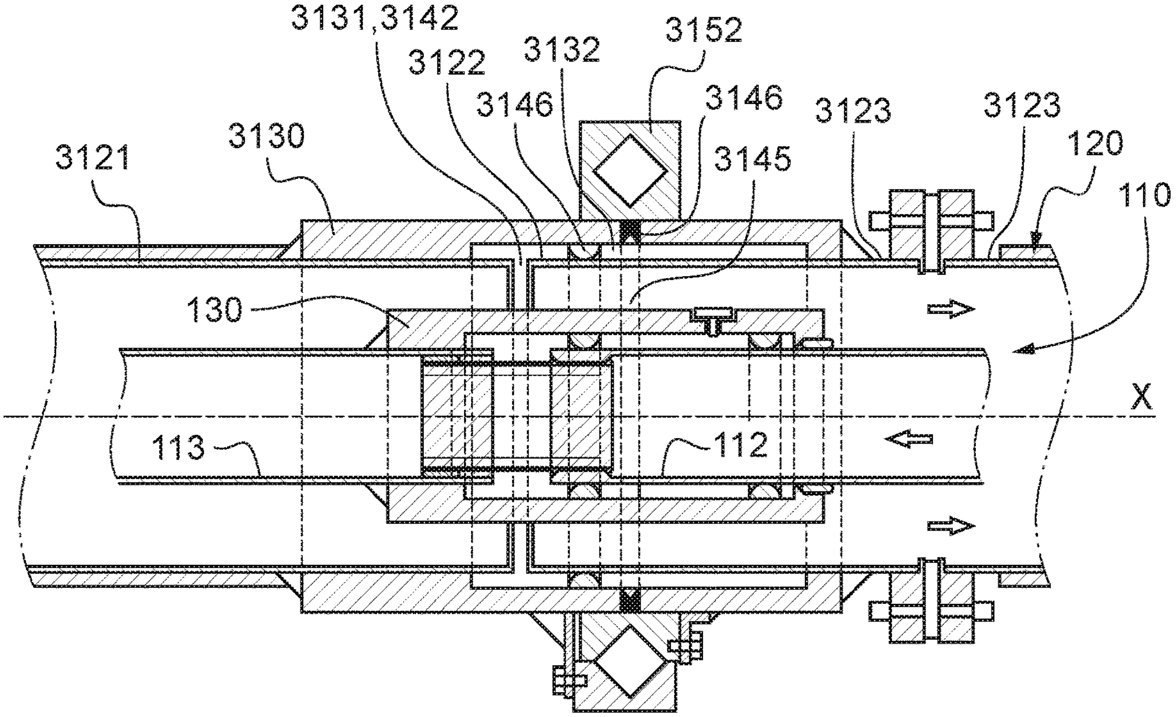
FIG. 11 represents a fluid transfer system according to an eighth embodiment forming a coaxial expansion joint according to a second variant.

FIG. 11 represents a fluid transfer system according to an eighth embodiment forming a coaxial expansion joint according to a second variant.

This embodiment differs from the preceding one in that the gas transfer pipe 120 includes here several sections, in particular three sections 3121, 3122, 3123.

This embodiment forms a swivel device allowing a complete rotation. The rotation is allowed by a hinge member 3152, for example with bearings, and/or journal bearings which can be pressurised, for example by the gas of the gas transfer pipe, or a lubricant accepting a temperature of −160° C. without setting.

It includes an additional buffer member 3130 surrounding here two sections 3121, 3122 of the three sections of the gas transfer pipe 120.

The additional buffer member 3130 is for example rigidly connected to a first section 3121 of the gas transfer pipe 120, and slidable relative to a second section 3122 of the gas transfer pipe 120.

This additional buffer member 3130 also includes an internal volume devoid of an inner wall, such that it only includes a chamber.

A fluid inlet 3131 in the internal volume includes here a leak passage 3142 formed by a clearance between the sections 3121, 3122.

A fluid outlet 3132 includes here a leak passage 3145 which is due to the presence of a dynamic sealing member 3146, which includes for example here a schematised O-ring and a lip seal for the insulation of the hinge member 3152.

Figure 12:
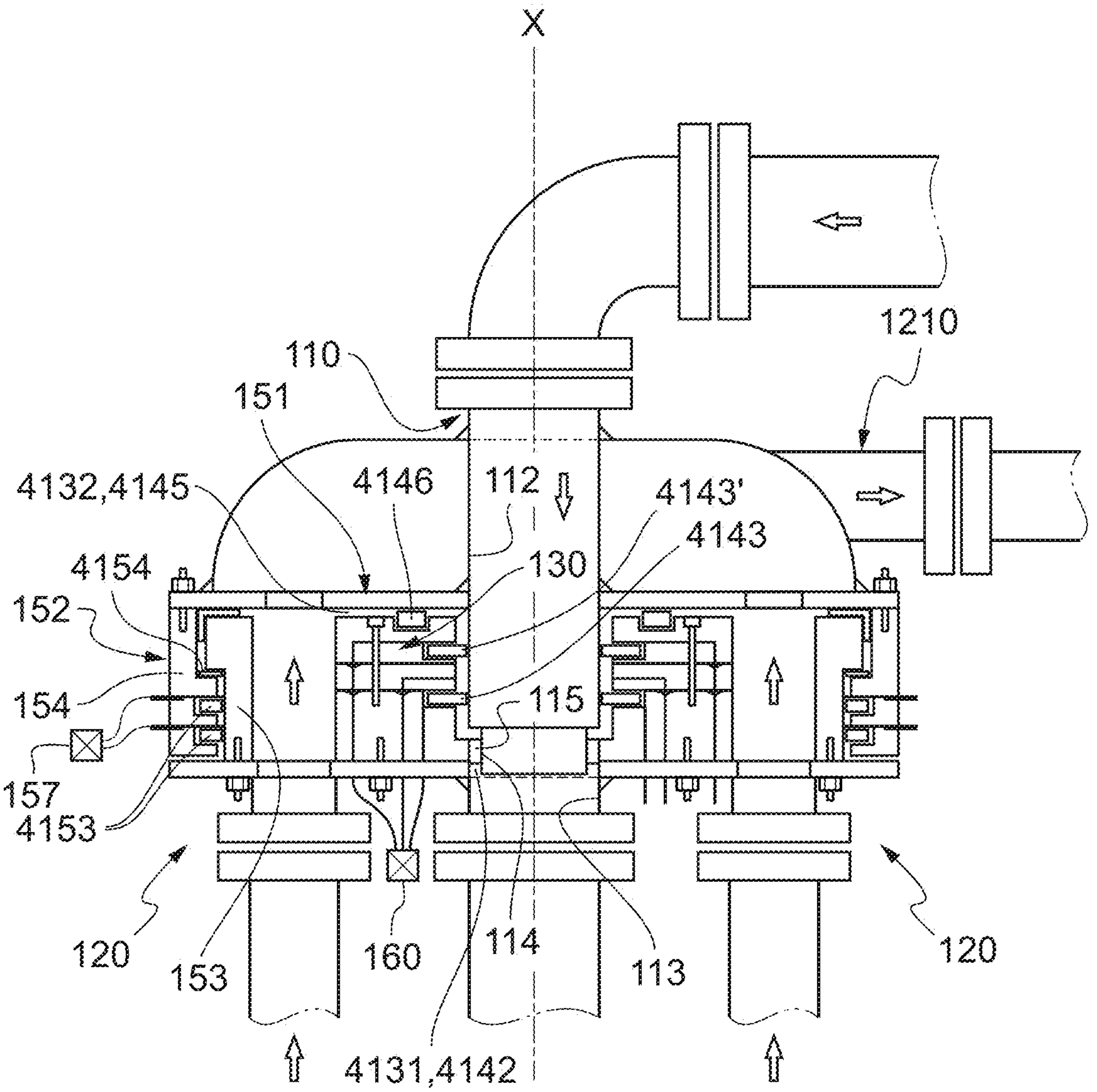
FIG. 12 represents a fluid transfer system according to a ninth embodiment.
Figure 13:
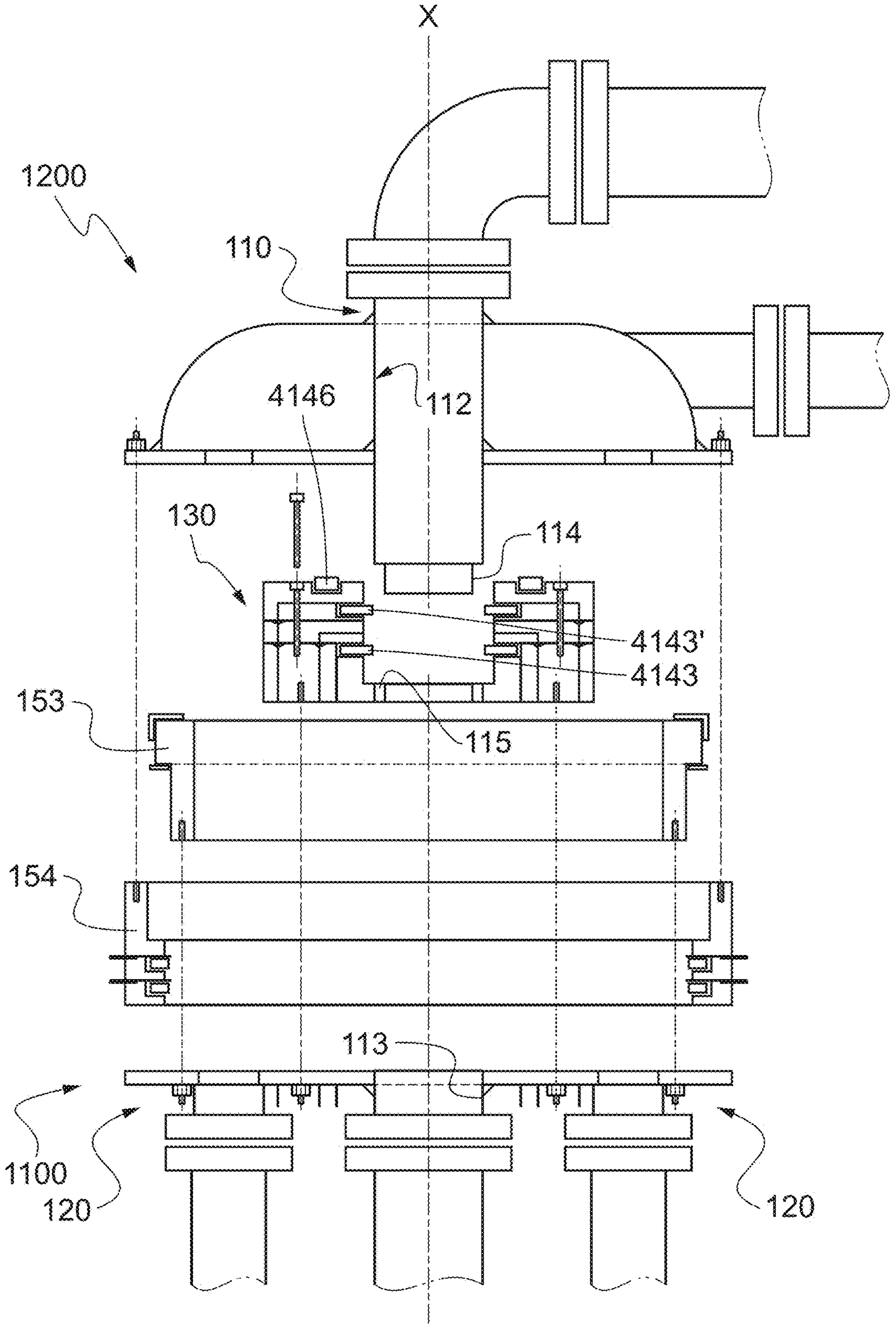
FIG. 13 represents the system of FIG. 12, partially exploded.

FIG. 12 represents a fluid transfer system according to a ninth embodiment and FIG. 13 represents the system of FIG. 12, partially exploded.

This embodiment has a fluid transfer system in a swivel joint device corresponding for example to an offshore loading or offloading buoy.

In this example, the hinge member 152 also includes a first part 153 rigidly connected to the first fixed annular part and a second part 154 rigidly connected to the second mobile annular part. The second part 154 of the hinge member 152 is here rotatable relative to the first part 153 of the hinge member 152.

However, the hinge member 152 includes here radial seals 4153 and friction bearings 4154 instead of the bearing of FIGS. 3 to 8 for example.

A specificity of a purging and cleaning system is obtained using an inert and dry gas—in particular nitrogen—which may also serve to activate radial seals.

To operate this device, two manifolds, the overflow manifold 160 and the manifold 157, are used: the overflow manifold 160 is configured to seal, purge or clean the buffer member 130, the manifold 157 is configured for the same operations on the hinge member which is here configured to also seal the gas transfer pipe 120 with respect to an external environment. A seal referred to as "weather seal", i.e. an external seal which protects the system from the marine environment, may be added if required.

It is possible to split the inlet/outlet ports for optimised flushing of the volumes in question. The use of journal bearings makes it possible for example to help reduce a thermal insulation to protect from the hinge member 152.

The buffer member 130 includes here a fluid inlet 4131 having a leak passage 4142 bypassing the bearing 115 and dynamic sealing members 4143, 4143', which here include radial seals. The dynamic sealing members 4143, 4143' delimit a first chamber of the buffer member 130 between them.

At the outlet 4132, a leak passage 4145 is formed by a dynamic sealing member 4146 including a bearing. The dynamic sealing member is here disposed between a wall of the buffer member 130 and the separating partition 151 and bearing against them.

As illustrated in FIG. 13, the fixed elements between them are rigidly connected by studs.

The buffer member 130 may be made of several parts to allow an assembly of the radial seals in open grooves. For clearer illustration, static seals (i.e. annealed copper washers or fibre seals for cryogenic use) are not shown. The parts are assembled for example with hexacave screws.

Figure 14:
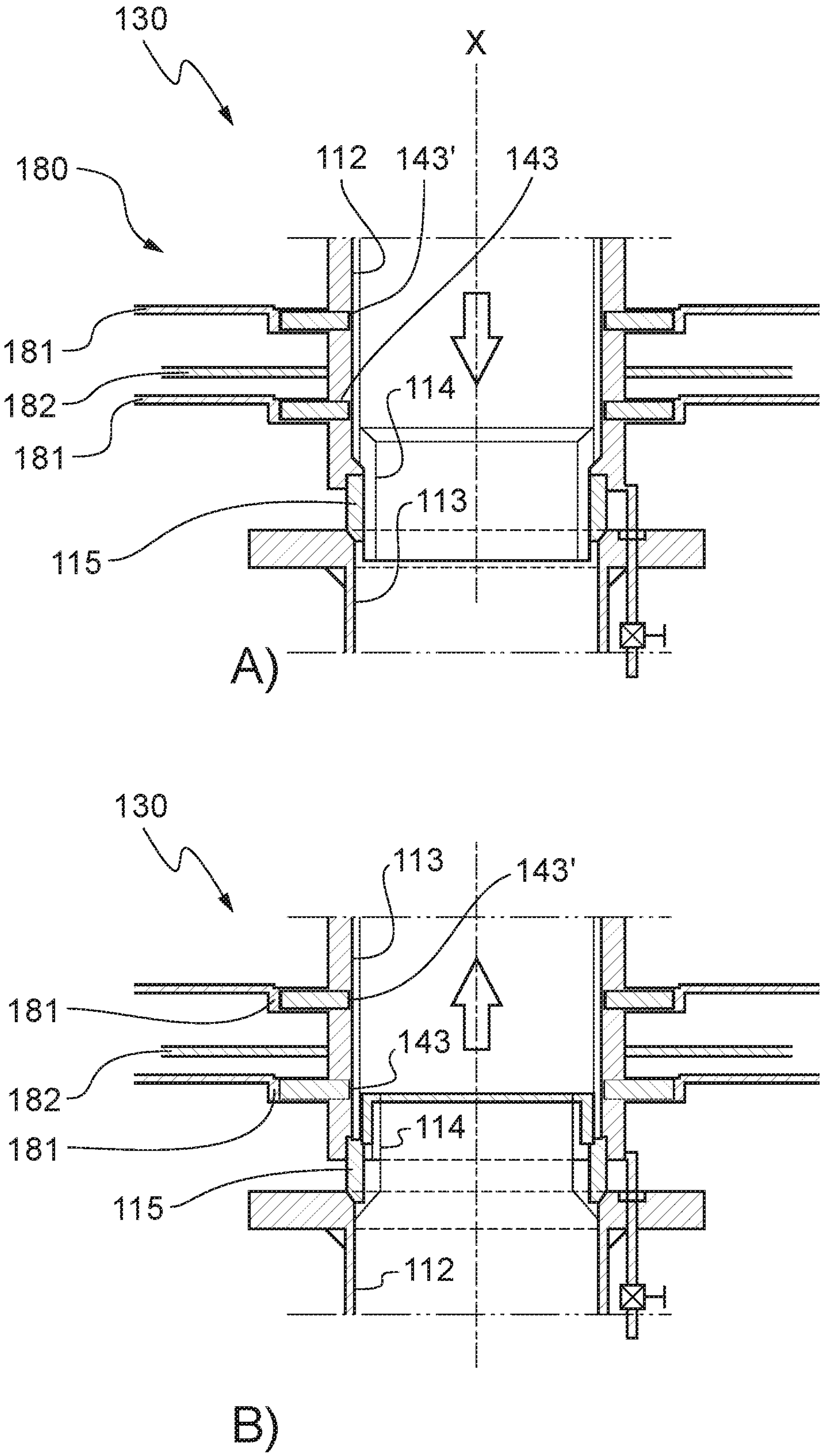
FIG. 14 illustrates alternative embodiments of the liquid transfer pipe according to a liquid flow direction in the liquid transfer pipe.

FIG. 14 illustrates alternative embodiments of the liquid transfer pipe 110 including the two incident 112 and receiving 113 sections, according to a direction of liquid flow in the liquid transfer pipe 110, and/or a desired pressure control for seals of the system.

The receiving section 113 may be oriented upwards (Figure A)) or downwards (Figure B)).

This can of course be transposed to all of the embodiments described above, and in the context of an embodiment according to FIG. 14B), then the receiving section 113 is configured to slide relative to the corresponding buffer member 130.

The fluid transfer system includes here a pressurisation system 180.

The pressurisation system 180 is here configured to clean and/or drain the buffer member 130.

In this example, the pressurisation system 180 includes at least one activation port 181 configured to activate a dynamic sealing member 143, 143', and at least one purging port 182, configured to drain at least a part of the internal volume of the buffer member.

The invention claimed is:

1. A fluid exploitation installation comprising:

a liquefaction unit;

a storage and/or transport entity;

a first swivel joint device including a fluid transfer system comprising a liquid transfer pipe configured to carry a liquefied gas, a gas transfer pipe configured to carry a gas in vapor form, the gas transfer pipe surrounding the liquid transfer pipe, the liquid transfer pipe and the gas transfer pipe being concentric, and a buffer member disposed between the liquid transfer pipe and the gas transfer pipe and at least partially surrounding the liquid transfer pipe, the buffer member being configured to transfer an evaporated portion of the liquefied gas circulating in the liquid transfer pipe from the liquid transfer pipe to the gas transfer pipe, the first swivel joint device being connected by an outlet coupling to the liquefaction unit and by the gas transfer pipe to the storage and/or transport entity, the liquid transfer pipe of the fluid transfer system connecting the liquefaction unit to one or more of the storage and transport entity; and at least a second swivel joint device, including an inlet pipe into the swivel joint device which is connected to a pipe of an underwater pipe network to extract natural gas, and an outlet coupling which is connected to the liquefaction unit.

2. The fluid exploitation installation according to claim 1, wherein the fluid transfer system comprises at least one dynamic sealing member.

3. The fluid exploitation installation according to claim 2, wherein the dynamic sealing member is disposed in the buffer member, at an interface between the buffer member and one or more of the liquid transfer pipe and the gas transfer pipe.

4. The fluid exploitation installation according to claim 2, wherein the dynamic sealing member includes a seal, a bearing, or a composite assembly.

5. The fluid exploitation installation according to claim 1, wherein the buffer member includes at least one inner wall forming a labyrinth for a fluidic flow in the buffer member.

6. The fluid exploitation installation according to claim 5, wherein the inner wall divides an internal volume of the buffer member into at least two chambers, a fluid inlet in the buffer member being disposed in a first of the two chambers, and a fluid outlet of the buffer member being disposed in a second of the two chambers.

7. The fluid exploitation installation according to claim 6, wherein at least one part of the fluid inlet in the buffer member is disposed at a lower height than a height of at least one part of the fluid outlet.

8. The fluid exploitation installation according to claim 6, wherein the fluid transfer system comprises a pressurisation system which includes a gas, the fluid transfer system being configured to inject gas from the pressurisation system in the internal volume of the buffer member.

9. The fluid exploitation installation according to claim 1, wherein the fluid transfer system is configured to compensate a length variation of the liquid transfer pipe.

10. The fluid exploitation installation according to claim 9, wherein the liquid transfer pipe includes an incident section equipped with an endpiece, and a receiving section in which the endpiece is inserted, the buffer member being fastened to at most one from the incident section and the receiving section.

11. The fluid exploitation installation according to claim 1, further comprising a swivel joint device, the swivel joint device including the fluid transfer system according to claim 1.

12. The fluid exploitation installation according to claim 1, further comprising a stack Stack of swivel joint devices including at least two swivel joint devices including at least the first swivel joint device.

13. The fluid exploitation installation according to claim 1, further comprising a stack of swivel joint devices including at least two swivel joint devices, the stack of swivel joint devices including at least the first swivel joint device and the second swivel joint device.

14. The fluid exploitation installation according to claim 1, further including comprising a ship, and at least one from among the first swivel joint device and the second swivel joint device is disposed on the ship.

* * * * *